(12) United States Patent
Grizzle et al.

(10) Patent No.: US 11,120,384 B1
(45) Date of Patent: Sep. 14, 2021

(54) SYSTEMS AND METHODS FOR MINING DATA TO IDENTIFY REAL TIME ACTIONABLE DATA VALUES FOR ONE OR MORE PERFORMANCE METRICS TO IMPROVE SALES

(71) Applicants: Closer Secrets, LLC, Boise, ID (US); Blueprint Nine, LLC, Pittsburgh, PA (US)

(72) Inventors: Randall Grizzle, Boise, ID (US); Valerie Grizzle, Boise, ID (US); Kale Abrahamson, Pittsburgh, PA (US); Taylor Hiott, Verona, PA (US)

(73) Assignees: Closer Secrets, LLC, Boise, ID (US); Blueprint Nine, LLC, Pittsburgh, PA (US)

( * ) Notice: Subject to any disclaimer, the term of this patent is extended or adjusted under 35 U.S.C. 154(b) by 0 days.

(21) Appl. No.: 17/025,915

(22) Filed: Sep. 18, 2020

(51) Int. Cl.
| | |
|---|---|
| *G06Q 10/06* | (2012.01) |
| *G06Q 30/02* | (2012.01) |
| *G06Q 20/40* | (2012.01) |
| *G06Q 40/00* | (2012.01) |

(52) U.S. Cl.
CPC . *G06Q 10/06398* (2013.01); *G06Q 10/06393* (2013.01); *G06Q 20/405* (2013.01); *G06Q 20/407* (2013.01); *G06Q 40/125* (2013.12)

(58) Field of Classification Search
CPC .......... G06Q 10/06398; G06Q 40/125; G06Q 10/06393; G06Q 20/405; G06Q 20/407
See application file for complete search history.

(56) References Cited

U.S. PATENT DOCUMENTS

| | | |
|---|---|---|
| 9,912,813 B2 | 3/2018 | Vymenets et al. |
| 2010/0121684 A1 | 5/2010 | Morio et al. |
| 2011/0060642 A1 | 3/2011 | Davis et al. |

(Continued)

FOREIGN PATENT DOCUMENTS

| | | |
|---|---|---|
| AU | 2018100794 A4 | 7/2018 |

OTHER PUBLICATIONS

Efti, S. (Aug. 11, 2020). Sales dashboard templates, examples & KPIs for hight-performing teams. https://blog.close.com/sales-dashboard/.

(Continued)

*Primary Examiner* — Talia F Crawley
(74) *Attorney, Agent, or Firm* — Dinsmore & Shohl LLP

(57) ABSTRACT

Embodiments of the present disclosure are directed to systems and methods for monitoring and visualizing a plurality of performance metrics via a single graphical user interface. A processor identifies the plurality of performance metrics, identifies predicted and real time values for the plurality of performance metrics and visually displays for a user the plurality of performance metrics in readable format. In some embodiments, the plurality of performance metrics are displayed in a graphical format. In other embodiments, the plurality of performance metrics are displayed in a spreadsheet format such that the different values and metrics may be arranged into a plurality of different combinations. Further, the processor determines the actual values for the plurality of performance metrics and may organize the visual display based on the current data, a change in data, and/or any other of a plurality of combinations.

30 Claims, 12 Drawing Sheets

(56) References Cited

U.S. PATENT DOCUMENTS

| | | | |
|---|---|---|---|
| 2014/0214473 A1* | 7/2014 | Gentile | G06Q 10/06313 |
| | | | 705/7.23 |
| 2014/0236663 A1 | 8/2014 | Smith et al. | |
| 2015/0142517 A1 | 5/2015 | Crugan et al. | |
| 2015/0363737 A1* | 12/2015 | Fairbanks | G06Q 20/202 |
| | | | 705/7.39 |
| 2017/0185936 A1* | 6/2017 | Guicciardi | G06Q 10/0633 |
| 2017/0236081 A1 | 8/2017 | Grady Smith et al. | |
| 2018/0065038 A1 | 3/2018 | Margiotta | |
| 2018/0101797 A1* | 4/2018 | Mueller | G06Q 10/06393 |
| 2020/0202279 A1* | 6/2020 | Kelly | G06Q 10/06393 |

OTHER PUBLICATIONS

Friedman, H., Spera, M., & Wardini, J. (Aug. 4, 2020). The Perfect Marketing Dashboard—How to Track and Report on Every Important Metric. https://www.growthmarketingpro.com/marketing-dashboard-report-template/.

* cited by examiner

FIG. 5

| Month | Week | Booking Date | Booking Time | Campaign | Assigned | Name | Phone | Email | Resolution | Day/Time Booked | Pay Period 1-15 and 16-EOM |
|---|---|---|---|---|---|---|---|---|---|---|---|
| 2 | 6 | 2/5/2020 | Wed, Feb 05, 2020, 10:00PM | Strategy Session | Jane A. Doe | John A. Smith | 1(234)567-8901 | JohnJJohnA@Smith.Com | closedlost | 2/5/2020 | 5 |
| 2 | 6 | 2/6/2020 | Thu, Feb 06, 2020, 5:30PM | Strategy Session | Jane B. Doe | John B. Smith | 1(234)678-8901 | JohnJJohnB@Smith.Com | | 2/5/2020 | 5 |
| 2 | 6 | 2/5/2020 | Wed, Feb 05, 2020, 5:00PM | Strategy Session | Jane C. Doe | John C. Smith | 1(234)789-8901 | JohnJJohnC@Smith.Com | appointment scheduled | 2/5/2020 | 5 |
| 2 | 6 | 2/6/2020 | Thu, Feb 06, 2020, 3:00PM | Strategy Session | Jane D. Doe | John D. Smith | 1(234)890-8901 | JohnJJohnD@Smith.Com | closedwon | 2/5/2020 | 5 |
| 2 | 6 | 2/5/2020 | Wed, Feb 05, 2020, 8:00PM | Strategy Session | Jane E. Doe | John E. Smith | 1(234)901-8901 | JohnJJohnE@Smith.Com | 243ef608-ad | 2/5/2020 | 5 |
| 2 | 6 | 2/5/2020 | Wed, Feb 05, 2020, 2:00PM | Strategy Session | Jane F. Doe | John F. Smith | 1(234)123-8901 | JohnJJohnF@Smith.Com | appointment scheduled | 2/5/2020 | 5 |
| 2 | 6 | 2/6/2020 | Thu, Feb 06, 2020, 1:00PM | Strategy Session | Jane G. Doe | John G. Smith | 1(234)234-8901 | JohnJJohnG@Smith.Com | | 2/5/2020 | 5 |
| 2 | 6 | 2/6/2020 | Thu, Feb 06, 2020, 10:30AM | Strategy Session | Jane H. Doe | John H. Smith | 1(234)456-8901 | JohnJJohnH@Smith.Com | appointment scheduled | 2/5/2020 | 5 |
| 2 | 6 | 2/5/2020 | Wed, Feb 05, 2020, 5:00PM | Strategy Session | Jane I. Doe | John I. Smith | 1(234)765-8901 | JohnJJohnI@Smith.Com | closedlost | 2/5/2020 | 5 |
| 2 | 6 | 2/6/2020 | Thu, Feb 06, 2020, 6:00PM | Strategy Session | Jane J. Doe | John J. Smith | 1(234)654-8901 | JohnJJohnJ@Smith.Com | appointment scheduled | 2/5/2020 | 5 |
| 2 | 6 | 2/6/2020 | Thu, Feb 06, 2020, 11:00AM | Strategy Session | Jane K. Doe | John K. Smith | 1(234)543-8901 | JohnJJohnK@Smith.Com | | 2/5/2020 | 5 |
| 2 | 6 | 2/6/2020 | Thu, Feb 06, 2020, 1:00PM | Strategy Session | Jane L. Doe | John L. Smith | 1(234)432-8901 | JohnJJohnL@Smith.Com | appointment scheduled | 2/5/2020 | 5 |
| 2 | 6 | 2/5/2020 | Wed, Feb 05, 2020, 3:30PM | Strategy Session | Jane M. Doe | John M. Smith | 1(234)321-8901 | JohnJJohnM@Smith.Com | closedlost | 2/5/2020 | 5 |

| Week | | Total Leads | Amount Collected | DPL | Total Contacted Leads | DPL Talked To |
|---|---|---|---|---|---|---|
| 10 | John A. Smith | 11 | $498.50 | $45.32 | #REF! | #REF! |
| | John B. Smith | 4 | $0.00 | $0.00 | #REF! | #REF! |
| | John C. Smith | 0 | $0.00 | | #REF! | #REF! |
| | John D. Smith | 0 | $0.00 | | 0 | #DIV/0! |
| | John E. Smith | 5 | $1,997.00 | $399.40 | 0 | #DIV/0! |
| | John F. Smith | 7 | $3,400.00 | $485.71 | 0 | #DIV/0! |
| | John G. Smith | 23 | $0.00 | $0.00 | | |
| | John H. Smith | 15 | $3,350.00 | $223.33 | | |
| | John I. Smith | 9 | $2,900.00 | $322.22 | | |
| | John J. Smith | 9 | $3,898.50 | $433.17 | | |
| | John K. Smith | 16 | $2,650.00 | $165.63 | | |
| | John L. Smith | 0 | $0.00 | | | |
| | John M. Smith | 19 | $18,650.00 | $981.58 | | |
| | John N. Smith | 15 | $8,097.00 | $539.80 | | |
| | John O. Smith | 14 | $14,547.00 | $1,039.07 | | |
| | John P. Smith | 18 | $8,797.00 | $488.72 | | |
| | John Q. Smith | 6 | $0.00 | $0.00 | | |
| | John R. Smith | 21 | $20,200.00 | $961.90 | | |
| | John S. Smith | 3 | $0.00 | $0.00 | | |
| | John T. Smith | 12 | $1,992.00 | $166.00 | | |
| | John U. Smith | 12 | $5,950.00 | $495.83 | | |
| | John V. Smith | 24 | $7,400.00 | $308.33 | | |
| | John W. Smith | 10 | $12,700.00 | $1,270.00 | | |
| | John X. Smith | 3 | $1,450.00 | $483.33 | | |
| | John Y. Smith | 15 | $3,898.50 | $259.90 | | |

| | Deposits | Purchase, Paid In Full (won) | No Purchase (Lost) | No Money | No Show | Called Once | Called Twice | Sets | Working | Call Schedule | Rescheduled |
|---|---|---|---|---|---|---|---|---|---|---|---|
| John A. Smith | 0 | 0 | 1 | 0 | 1 | 0 | 0 | 0 | 0 | 5 | 0 |
| John B. Smith | 0 | 0 | 1 | 0 | 0 | 0 | 0 | 0 | 0 | 1 | 0 |
| John C. Smith | 0 | 0 | 0 | 0 | 0 | 0 | 0 | 0 | 0 | 0 | 0 |
| John D. Smith | 0 | 1 | 0 | 0 | 1 | 0 | 0 | 0 | 0 | 0 | 0 |
| John E. Smith | 0 | 0 | 0 | 0 | 0 | 0 | 0 | 0 | 0 | 2 | 0 |
| John F. Smith | 0 | 0 | 0 | 0 | 0 | 0 | 0 | 0 | 0 | 3 | 0 |
| John G. Smith | 0 | 0 | 0 | 0 | 1 | 0 | 0 | 0 | 0 | 8 | 0 |
| John H. Smith | 0 | 0 | 0 | 0 | 0 | 0 | 0 | 0 | 0 | 8 | 0 |
| John I. Smith | 0 | 0 | 0 | 0 | 2 | 0 | 0 | 0 | 0 | 7 | 0 |
| John J. Smith | 0 | 0 | 0 | 0 | 1 | 0 | 0 | 0 | 0 | 3 | 0 |
| John K. Smith | 0 | 0 | 0 | 0 | 0 | 0 | 0 | 0 | 0 | 10 | 0 |
| John L. Smith | 0 | 0 | 1 | 0 | 2 | 0 | 0 | 0 | 0 | 0 | 0 |
| John M. Smith | 0 | 1 | 1 | 0 | 0 | 0 | 0 | 0 | 0 | 11 | 0 |
| John N. Smith | 0 | 1 | 0 | 0 | 1 | 0 | 0 | 0 | 0 | 6 | 0 |
| John O. Smith | 0 | 0 | 0 | 0 | 0 | 0 | 0 | 0 | 0 | 11 | 0 |
| John P. Smith | 0 | 1 | 1 | 0 | 2 | 0 | 0 | 0 | 0 | 3 | 0 |
| John Q. Smith | 0 | 0 | 2 | 0 | 4 | 0 | 0 | 0 | 0 | 13 | 0 |
| John R. Smith | 0 | 0 | 0 | 0 | 1 | 0 | 0 | 0 | 0 | 3 | 0 |
| John S. Smith | 0 | 0 | 6 | 0 | 2 | 0 | 0 | 0 | 0 | 7 | 0 |
| John T. Smith | 0 | 1 | 0 | 0 | 0 | 0 | 0 | 0 | 0 | 6 | 0 |
| John U. Smith | 0 | 0 | 0 | 0 | 0 | 0 | 0 | 0 | 0 | 5 | 0 |
| John V. Smith | 0 | 0 | 0 | 0 | 0 | 0 | 0 | 0 | 0 | 6 | 0 |
| John W. Smith | 0 | 0 | 0 | 0 | 1 | 0 | 0 | 0 | 0 | 1 | 0 |
| John X. Smith | 0 | 0 | 1 | 0 | 0 | 0 | 0 | 0 | 0 | 1 | 0 |
| John Y. Smith | 0 | 0 | 0 | 0 | 0 | 0 | 0 | 0 | 0 | 9 | 0 |
| John Z. Smith | 0 | 0 | 0 | 0 | 0 | 0 | 0 | 0 | 0 | 0 | 0 |
| John A. Doe | 0 | 0 | 0 | 0 | 0 | 0 | 0 | 0 | 0 | 0 | 0 |
| John B. Doe | 0 | 0 | 0 | 0 | 0 | 0 | 0 | 0 | 0 | 3 | 0 |
| John C. Doe | 0 | 0 | 0 | 0 | 0 | 0 | 0 | 0 | 0 | 12 | 0 |
| John D. Doe | 0 | 0 | 0 | 0 | 0 | 0 | 0 | 0 | 0 | 8 | 0 |
| John E. Doe | 0 | 0 | 0 | 0 | 0 | 0 | 0 | 0 | 0 | 8 | 0 |
| John F. Doe | 0 | 0 | 0 | 0 | 0 | 0 | 0 | 0 | 0 | 16 | 0 |
| John G. Doe | 0 | 0 | 0 | 0 | 0 | 0 | 0 | 0 | 0 | 14 | 0 |
| John H. Doe | 0 | 0 | 0 | 0 | 0 | 0 | 0 | 0 | 0 | 0 | 0 |
| John I. Doe | 0 | 0 | 0 | 0 | 0 | 0 | 0 | 0 | 0 | 0 | 0 |

FIG. 7

| Month | Week | Pay | Date | Client Name | Amount Collected | Setter | email | Left to Pay | |
|---|---|---|---|---|---|---|---|---|---|
| 12 | 1 | | 12/30 | John A. Smith | $2,900.00 | Jane A. Doe | JohnA@Smith.Com | PIF | KTVIP* $5,800.00 *$0* *Jane A. Doe* *Jane B. Doe* *TOS Signed* |
| 12 | 1 | | 12/30 | John B. Smith | $2,900.00 | Jane B. Doe | JohnB@Smith.Com | PIF | |
| 12 | 1 | | 12/30 | John C. Smith | $2,999.00 | Jane C. Doe | JohnC@Smith.Com | PIF | 2.0 boost 9 pick list 2999 O Jane C. Doe |
| 12 | 1 | | 12/31 | John D. Smith | $500.00 | Jane D. Doe | JohnD@Smith.Com | PIF | $500 Collected $500 Outstanding (1500) Setter - Jane D. Doe |
| 12 | 1 | | 12/31 | John E. Smith | $700.00 | Jane E. Doe | JohnE@Smith.Com | | KTVIP $700 Collected $4250 Outstanding Setter - Jane E. Doe |
| 12 | 1 | | 12/31 | John F. Smith | $1,500.00 | Jane F. Doe | JohnF@Smith.Com | $2,800.00 | VIP Collected $3000 Balance $2800 Setter Closer Jane G. Doe TOS Signed |
| 12 | 1 | | 12/31 | John G. Smith | $1,500.00 | Jane G. Doe | JohnG@Smith.Com | $2,800.00 | |
| 1 | 1 | 1 | 1/1 | John H. Smith | $700.00 | Jane H. Doe | JohnH@Smith.Com | $1,450.00 | KTVIP $700 Collected $4250 Outstanding Setter - Jane H. Doe |
| 1 | 1 | 1 | 1/1 | John I. Smith | $6,800.00 | Jane I. Doe | JohnI@Smith.Com | PIF | VIP Plus 6800 Balance 0 Setter Closer Jane I. Doe |
| 1 | 1 | 1 | 1/1 | John J. Smith | $5,800.00 | Jane J. Doe | JohnJ@Smith.Com | PIF | KTVIP Plus Setter Jane J. Doe Closer Jane I. Doe TOS signed |
| 1 | 1 | 1 | 1/1 | John K. Smith | $700.00 | Jane K. Doe | JohnK@Smith.Com | | KTVIP $700 Collected $3550 Closer and Setter - Jane K. Doe |
| 1 | 1 | 1 | 1/2 | John L. Smith | $1,500.00 | Jane L. Doe | JohnL@Smith.Com | $1,450.00 | |
| 1 | 1 | 1 | 1/2 | John M. Smith | $2,900.00 | Jane M. Doe | JohnM@Smith.Com | PIF | Nine U + B9 + PPL $2900 $0 S-Jane Doe C-Jane Doe TOS signed |
| 1 | 1 | 1 | 1/2 | John N. Smith | $1,950.00 | Jane N. Doe | JohnN@Smith.Com | PIF | VIP Plus 3900in one month scheduled on autopay in funnels S&C- Jane N. Doe |
| 1 | 1 | 1 | 1/2 | John O. Smith | $1,500.00 | Jane O. Doe | JohnO@Smith.Com | $2,800.00 | KTVIP $3000 Paid $2800 C - Jane Doe S - Jane Doe TOS signed |
| 1 | 1 | 1 | 1/2 | John P. Smith | $1,950.00 | Jane P. Doe | JohnP@Smith.Com | PIF | |
| 1 | 1 | 1 | 1/2 | John Q. Smith | $700.00 | Jane Q. Doe | JohnQ@Smith.Com | $1,450.00 | KTVIP $700 Collected $2850 Outstanding S - Jane E. Doe |
| 1 | 1 | 1 | 1/3 | John R. Smith | $2,900.00 | Jane R. Doe | JohnR@Smith.Com | PIF | |
| 1 | 1 | 1 | 1/3 | John S. Smith | $300.00 | Jane S. Doe | JohnS@Smith.Com | PIF | Nine U Boost 9 Picklist $300 Collected $300 outstanding S-Jane Doe C-Jane Doe |
| 1 | 1 | 1 | 1/3 | John T. Smith | $1,500.00 | Jane T. Doe | JohnT@Smith.Com | $5,300.00 | KTVIP $1500 Paid $5300 Outstanding S - Jane E. Doe |
| 1 | 1 | 1 | 1/3 | John U. Smith | $1,000.00 | Jane U. Doe | JohnU@Smith.Com | PIF | Nine U + B9 + PPL $2000 $0 S-Jane Doe C-Jane Doe |
| 1 | 1 | 1 | 1/3 | John V. Smith | $4,900.00 | Jane V. Doe | JohnV@Smith.Com | PIF | |
| 1 | 1 | 1 | 1/3 | John W. Smith | $998.50 | Jane W. Doe | JohnW@Smith.Com | PIF | Nine U + B9 + PPL $1997 $0 S-Jane Doe C-Jane Doe |

FIG. 8

| Pay Period Break Out | Total Leads | Total Collected | DPL | Deal Count | Deal Refunded | Amount Refunded | Duplicate/ Removed | Team Leads | Team Collection | Team DPL | Leads Removed | Total Deals | Total Refunded | $ Refunded | Pay Out Date |
|---|---|---|---|---|---|---|---|---|---|---|---|---|---|---|---|
| | | | | | | | | Team | | | | | | | |
| | Closer: John A. Smith | | | | | | | | | | | | | | |
| Jan 1 - Jan 15 | 1 | 39 | $12,800.00 | $328.21 | 6 | 1 | $900.00 | 0 | 2496 | $838,530.52 | $335.95 | 0 | | 30 | $60,642.50 | 1/31 |
| Jan 16 - Jan 19 | 2 | 13 | $2,900.00 | $223.08 | 1 | 0 | $0.00 | 0 | 632 | $212,167.00 | $335.71 | 0 | | 15 | $22,597.00 | 1/31 |
| Jan 20 - Jan 26 | 3 | 13 | $0.00 | $0.00 | 0 | 0 | $0.00 | 0 | 1146 | $431,649.00 | $376.99 | 0 | | 10 | $29,700.00 | 2/7 |
| Jan 27 - Feb 2 | 4 | 21 | $8,048.50 | $383.26 | 4 | 0 | $0.00 | 0 | 1065 | $294,128.00 | $276.18 | 0 | | 5 | $14,697.00 | 2/14 |
| Feb 3 - Feb 9 | 5 | 16 | $7,400.00 | $462.50 | 2 | 1 | $5,300.00 | 0 | 818 | $304,952.37 | $372.80 | 0 | | 6 | $18,397.00 | 2/21 |
| Feb 10 - Feb 16 | 6 | 23 | $6,897.00 | $299.87 | 2 | 0 | $0.00 | 0 | 772 | $332,311.50 | $430.48 | 0 | | 4 | $8,394.00 | 2/28 |
| Feb 17 - Feb 23 | 7 | 20 | $1,500.00 | $75.00 | 3 | 0 | $0.00 | 0 | 867 | $425,658.00 | $490.96 | 0 | | 2 | $16,800.00 | 3/6 |
| Feb 24 - Mar 1 | 8 | 18 | $14,050.00 | $780.56 | 8 | 0 | $0.00 | 0 | 733 | $396,157.00 | $540.46 | 0 | | 7 | $9,297.00 | 3/13 |
| Mar 2 - Mar 8 | 9 | 16 | $5,498.50 | $343.66 | 4 | 0 | $0.00 | 0 | 743 | $405,748.00 | $546.10 | 0 | | 3 | $2,882.00 | 3/27 |
| Mar 9 - Mar 15 | 10 | 13 | $3,197.00 | $245.92 | 4 | 0 | $0.00 | 0 | 608 | $283,403.00 | $466.12 | 0 | | 8 | $16,400.00 | 4/3 |
| Mar 16 - Mar 22 | 11 | 12 | $0.00 | $0.00 | 0 | 0 | $0.00 | 0 | 507 | $294,633.00 | $581.13 | 0 | | 4 | $6,800.00 | 4/10 |
| Mar 23 - Mar 29 | 12 | 11 | $1,348.50 | $122.59 | 3 | 0 | $0.00 | 0 | 642 | $312,467.00 | $486.71 | 0 | | 5 | $10,900.00 | 4/17 |
| Mar 30 - Apr 5 | 13 | 21 | $6,697.00 | $558.08 | 7 | 0 | $0.00 | 0 | 1135 | $453,912.00 | $399.92 | 0 | | 11 | $15,080.00 | 4/24 |
| Apr 6 - Apr 12 | 14 | 23 | $1,800.00 | $78.26 | 1 | 0 | $0.00 | 0 | 1153 | $417,126.99 | $361.78 | 0 | | 20 | $28,341.00 | 5/1 |
| Apr 13 - Apr 19 | 15 | 25 | $2,800.00 | $112.00 | 3 | 0 | $0.00 | 0 | 1195 | $488,228.98 | $390.15 | 0 | | 10 | $18,491.00 | 5/8 |
| Apr 20 - Apr 26 | 16 | 12 | $6,697.00 | $558.08 | 7 | 0 | $0.00 | 0 | 836 | $361,561.00 | $432.49 | 0 | | 1 | $1,000.00 | 5/15 |
| Apr 27 - May 3 | 17 | 9 | $0.00 | $0.00 | 0 | 0 | $0.00 | 0 | 1194 | $437,993.50 | $366.83 | 0 | | 9 | $34,280.00 | 5/22 |
| May 4 - May 10 | 18 | 6 | $2,228.00 | $371.33 | 6 | 0 | $0.00 | 0 | 644 | $234,284.99 | $381.89 | 0 | | 3 | $1,200.00 | 5/29 |
| May 11 - May 17 | 19 | 8 | $832.33 | $104.04 | 2 | 1 | $166.67 | 0 | 657 | $250,901.00 | $307.12 | 0 | | 8 | $11,197.00 | 6/5 |
| May 18 - May 24 | 20 | 5 | $0.00 | $0.00 | 0 | 0 | $0.00 | 0 | 648 | $199,011.00 | $266.09 | 0 | | 1 | $0.00 | 6/12 |
| May 25 - May 31 | 21 | 4 | $0.00 | $0.00 | 0 | 0 | $0.00 | 0 | 900 | $239,484.50 | $498.21 | 0 | | 8 | $38,300.00 | 6/19 |
| June 1 - June 7 | 22 | 7 | $0.00 | $0.00 | 1 | 1 | $4,900.00 | 0 | 796 | $396,575.00 | $386.93 | 0 | | 7 | $22,200.00 | 6/26 |
| June 8 - June 14 | 23 | 5 | $0.00 | $0.00 | 0 | 0 | $0.00 | 0 | 938 | $382,938.50 | $531.98 | 0 | | 19 | $43,984.00 | 7/3 |
| June 15 - June 21 | 24 | 0 | $0.00 | | 0 | 0 | $0.00 | 0 | 767 | $408,010.84 | $469.73 | 0 | | 4 | $4,494.00 | 7/10 |
| June 22 - June 28 | 25 | 1 | $0.00 | $0.00 | 0 | 0 | $0.00 | 0 | 880 | $413,365.50 | $460.64 | 0 | | 17 | $21,397.00 | 7/17 |
| June 29 - July 5 | 26 | 0 | $0.00 | | 0 | 0 | $0.00 | 0 | 568 | $261,643.50 | $433.21 | 0 | | | $20,600.00 | 7/24 |
| July 6 - July 12 | 27 | 0 | $0.00 | | 0 | 0 | $0.00 | 0 | 719 | $252,324.00 | $366.75 | 0 | | | $13,284.00 | 7/31 |
| July 13 - July 19 | 28 | 0 | $0.00 | | 0 | 0 | $0.00 | 0 | 688 | $252,324.00 | $429.45 | 0 | | | $45,093.00 | 8/7 |
| July 20 - July 26 | 29 | 6 | $0.00 | $0.00 | 0 | 0 | $0.00 | 0 | 663 | $284,726.00 | $391.87 | 0 | | | $9,985.00 | 8/14 |
| July 27 - Aug 2 | 30 | 5 | $0.00 | $0.00 | 0 | 0 | $0.00 | 0 | 644 | $252,361.50 | $537.90 | 0 | | | $24,499.00 | 8/17 |
| Aug 3 - Aug 9 | 31 | 5 | $0.00 | $0.00 | 0 | 0 | $0.00 | 0 | 412 | $221,616.50 | $397.34 | 0 | | | $0.00 | 8/21 |
| Aug 10 - Aug 16 | 32 | 0 | $0.00 | | 0 | 0 | $0.00 | 0 | 541 | $214,961.00 | $355.22 | 0 | | | $6,000.00 | 8/28 |
| Aug 17 - Aug 23 | 33 | 0 | $1,500.00 | | 0 | 0 | $0.00 | 0 | 180 | $83,939.00 | | 0 | | | $6,800.00 | 9/4 |
| Aug 24 - Aug 30 | 34 | 0 | $0.00 | | 0 | 0 | $0.00 | 0 | 0 | $0.00 | | 0 | | | $0.00 | 9/11 |
| Aug 31 - Sept 6 | 35 | 0 | $0.00 | | 0 | 0 | $0.00 | 0 | 0 | $0.00 | | 0 | | | $0.00 | 9/18 |
| Sept 7 - Sept 13 | 36 | 0 | $0.00 | | 0 | 0 | $0.00 | 0 | 0 | $0.00 | | 0 | | | $0.00 | 9/25 |
| Sept 14 - Sept 20 | 37 | 0 | $0.00 | | 0 | 0 | $0.00 | 0 | 0 | $0.00 | | 0 | | | $0.00 | 10/2 |
| Sept 21 - Sept 27 | 38 | 0 | $0.00 | | 0 | 0 | $0.00 | 0 | 0 | $0.00 | | 0 | | | $0.00 | 10/9 |
| Sept 28 - Oct 4 | 39 | 0 | $0.00 | | 0 | 0 | $0.00 | 0 | 0 | $0.00 | | 0 | | | $0.00 | 10/16 |
| Oct 5 - Oct 11 | 40 | 0 | $0.00 | | 0 | 0 | $0.00 | 0 | 0 | $0.00 | | 0 | | | $0.00 | 10/23 |

FIG. 9

| | Online - Purchased | Live - Purchased | Didn't See Value | No Money | Canceled | No Show | Working | Appointment Scheduled | Deposit Made | Total Leads | Amount Collected | DPL |
|---|---|---|---|---|---|---|---|---|---|---|---|---|
| Puerto Rico; San Juan (GMT-4:00) | 0 | 0 | 0 | 0 | 0 | 1 | 0 | 0 | 0 | 1 | 0 | $0.00 |
| Qatar; Doha (GMT+3:00) | 0 | 0 | 0 | 0 | 0 | 1 | 0 | 1 | 0 | 3 | 0 | $0.00 |
| Romania; Bucharest (GMT+2:00) | 0 | 0 | 0 | 1 | 0 | 0 | 0 | 0 | 0 | 2 | 0 | $0.00 |
| Russian Federation; Moscow, St. Petersburg (GMT+3:00) | 1 | 0 | 0 | 0 | 0 | 0 | 0 | 0 | 0 | 1 | 0 | $0.00 |
| Saudi Arabia; Riyadh, Mecca (GMT+3:00) | 1 | 0 | 0 | 0 | 0 | 0 | 0 | 0 | 0 | 1 | 0 | $0.00 |
| Singapore; Singapore City (GMT+8:00) | 0 | 0 | 2 | 0 | 1 | 0 | 0 | 0 | 1 | 4 | 0 | $0.00 |
| Slovakia; Bratislava (GMT+1:00) | 0 | 0 | 0 | 0 | 0 | 0 | 0 | 0 | 0 | 1 | 0 | $0.00 |
| Slovenia; Ljubljana (GMT+1:00) | 0 | 0 | 0 | 2 | 0 | 2 | 0 | 0 | 0 | 4 | 0 | $0.00 |
| Somalia; Mogadishu (GMT+3:00) | 0 | 0 | 0 | 1 | 0 | 0 | 0 | 0 | 0 | 1 | 0 | $0.00 |
| South Africa; Cape Town, Johannesburg, Pretoria (GMT+2:00) | 1 | 0 | 1 | 0 | 0 | 1 | 1 | 0 | 0 | 7 | 0 | $0.00 |
| Spain, Mainland (Madrid, Barcelona); Baleares, Melilla, Ceuta (GMT+1:00) | 2 | 0 | 0 | 3 | 0 | 0 | 0 | 0 | 0 | 5 | 6000 | $1,200.00 |
| Sri Lanka; Colombo (GMT+5:30) | 0 | 0 | 0 | 1 | 0 | 0 | 0 | 0 | 0 | 1 | 0 | $0.00 |
| Sweden; Stockholm (GMT+1:00) | 0 | 0 | 0 | 1 | 0 | 0 | 0 | 1 | 0 | 2 | 0 | $0.00 |
| Switzerland; Zurich, Bern, Geneva (GMT+1:00) | 2 | 0 | 0 | 0 | 0 | 0 | 0 | 0 | 0 | 2 | 3000 | $1,500.00 |
| Taiwan; Taipei (GMT+8:00) | 0 | 1 | 0 | 1 | 0 | 0 | 0 | 0 | 0 | 2 | 1000 | $500.00 |
| Uganda; Kampala (GMT+3:00) | 0 | 0 | 0 | 0 | 0 | 2 | 0 | 0 | 0 | 2 | 0 | $0.00 |
| United Arab Emirates; Abu Dhabi, Dubai (GMT+4:00) | 0 | 0 | 0 | 0 | 0 | 3 | 1 | 1 | 1 | 9 | 8000 | $888.89 |
| United Kingdom; London, Birmingham, Glasgow (GMT 0:00) | 7 | 3 | 3 | 9 | 4 | 16 | 3 | 4 | 1 | 52 | 14000 | $269.23 |
| United States; Arizona (GMT-7:00) | 0 | 1 | 0 | 0 | 1 | 1 | 0 | 1 | 0 | 4 | 8000 | $2,000.00 |
| United States; Central Time (GMT-5:00)[DST] | 0 | 0 | 0 | 0 | 0 | 0 | 0 | 1 | 0 | 2 | 0 | $0.00 |
| United States; Central Time (GMT-6:00) | 7 | 1 | 1 | 1 | 2 | 2 | 3 | 1 | 0 | 21 | 8000 | $380.95 |
| United States; Eastern Time (GMT-4:00)[DST] | 0 | 1 | 0 | 0 | 1 | 0 | 0 | 1 | 0 | 4 | 8000 | $2,000.00 |
| United States; Eastern Time (GMT-5:00) | 12 | 7 | 3 | 11 | 5 | 9 | 6 | 0 | 2 | 55 | 36870 | $670.36 |
| United States; Hawaii (GMT-10:00) | 0 | 0 | 0 | 0 | 1 | 0 | 0 | 0 | 0 | 1 | 0 | $0.00 |
| United States; Mountain Time (GMT-6:00)[DST] | 1 | 0 | 0 | 0 | 0 | 0 | 0 | 0 | 0 | 1 | 3000 | $3,000.00 |
| United States; Mountain Time (GMT-7:00) | 0 | 0 | 0 | 2 | 1 | 0 | 0 | 0 | 0 | 3 | 0 | $0.00 |
| United States; Pacific Time (GMT-7:00)[DST] | 0 | 0 | 0 | 0 | 0 | 0 | 1 | 0 | 0 | 1 | 0 | $0.00 |
| United States; Pacific Time (GMT-8:00) | 12 | 5 | 2 | 4 | 3 | 3 | 1 | 1 | 0 | 33 | 43000 | $1,303.03 |

SYSTEMS AND METHODS FOR MINING DATA TO IDENTIFY REAL TIME ACTIONABLE DATA VALUES FOR ONE OR MORE PERFORMANCE METRICS TO IMPROVE SALES

TECHNICAL FIELD

The present disclosure generally relates to a plurality of electronic on demand sales metrics, and, more particularly, to systems and methods for extracting, from a plurality of databases, the plurality of electronic sales metrics to visually display in a single source.

BACKGROUND

It is known to incorporate, within business processes, certain sales metrics based on particular sales people, such as a number of leads, closings, and the like. However, these sales metrics are generally not real time data and do not provide for instant reporting capabilities of these metrics. Further, in the online sales world, there may be salespeople all over the world working for the same entity and the tracking of those sales people is more complicated than an in-house sales team. As such, the metrics maybe stored on different computers or databases from across the world, which makes it difficult to gather and evaluate the information for the metrics.

SUMMARY

In one embodiment, a system to provide a single resource for identifying one or more performance metric data and a plurality of real time data thereof is provided. The system includes a processing device and a non-transitory, processor-readable storage medium in communication with the processing device. The non-transitory, processor-readable storage medium includes one or more programming instructions that, when executed, cause the processing device to obtain a payment action initiation that is initiated external to the processing device, add a payment data generated from the payment action initiation into a macro, normalize the payment data generated from the payment action initiation into a payment action data, determine a type of payment action based on the payment action data, categorize the determined type of payment action, populate the determined type of payment action into a leads worksheet, populate the determined type of payment action into a sales team worksheet, and populate the determined type of payment action into a year to date worksheet. Further, the non-transitory, processor-readable storage medium includes one or more programming instructions that, when executed, cause the processing device to merge the determined type of payment action on the year to date worksheet, the determined type of payment action onto the sales team worksheet and the determined type of payment action onto the leads worksheet into a master breakdown worksheet to generate a working corpus of data, receive a search query from a user display device requesting the determined type of payment action for one or more sales team members, select the determined type of payment action for the one or more sales team members from the working corpus of data or the selected plurality of real time data for the selected one or more performance metrics for the one or more sales team members, and output the data corresponding to the determined type of payment action for the one or more sales team members from the working corpus such that the data causes the user display device to display the type of the determined type of payment action or the selected plurality of real time data for the selected one or more performance metrics for the one or more sales team members and identifying, by the processing device, when the plurality of real time data within the working corpus of data for the one or more performance metric data meets a predetermined threshold so to be distinguished when displayed on the user display device, wherein the determined type of payment action is the plurality of real time data that corresponds to the one or more performance metric data.

In another embodiment, a method to identify one or more performance metric data and a plurality of real time data thereof is provided. The method includes obtaining, by a processing device, a payment action initiation that is initiated external to the processing device, adding, by the processing device, a payment data generated from the payment action initiation into a macro, normalizing, by the processing device, the payment data generated from the payment action initiation into a payment action data, determining, by the processing device, a type of payment action based on the payment action data, and categorizing, by the processing device, the determined type of payment action. The method continues by populating, by the processing device, the determined type of payment action into a leads worksheet, populating, by the processing device, the determined type of payment action into a sales team worksheet, populating, by the processing device, the determined type of payment action into a year to date worksheet, merging, by the processing device, the determined type of payment action in the year to date worksheet, the determined type of payment action into the sales team worksheet and the determined type of payment action into the leads worksheet into a master breakdown worksheet to generate a working corpus of data and receiving, by the processing device, a search query from a user display device requesting the determined type of payment action for one or more sales team members or the plurality of real time data for a selected one or more performance metric data. Further, the method continues by selecting, by the processing device, the determined type of payment action for the one or more sales team members from the working corpus of data or the selected plurality of real time data for the selected one or more performance metrics for the one or more sales team members and outputting, to the user display device, the data corresponding to the determined type of payment action for the one or more sales team members from the working corpus such that the data causes the user display device to display the type of the determined type of payment action or the selected plurality of real time data for the selected one or more performance metrics for the one or more sales team members and identifying, by the processing device, when the plurality of real time data within the working corpus of data for the one or more performance metric data meets a predetermined threshold so to be distinguished when displayed on the user display device, wherein the determined type of payment action is the plurality of real time data that corresponds to the one or more performance metric data.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

FIG. 5 schematically depicts a partial view of a leads worksheet of a graphical interface according to one or more embodiments described and illustrated herein;

FIG. 6A schematically depicts a partial view of a summary worksheet of the graphical interface according to one or more embodiments described and illustrated herein;

FIG. 6B schematically depicts a continued partial view of a summary worksheet of FIG. 6A according to one or more embodiments described and illustrated herein;

FIG. 7 schematically depicts a partial view of a sales team breakdown worksheet of the graphical interface according to one or more embodiments described and illustrated herein;

FIG. 8 schematically depicts a partial view of a pay period worksheet of the graphical interface according to one or more embodiments described and illustrated herein FIG. 9 schematically depicts a partial view of a world breakdown sales worksheet of the graphical interface according to one or more embodiments described and illustrated herein.

DETAILED DESCRIPTION

Embodiments of the present disclosure are directed to systems and methods for monitoring and visualizing contact a plurality of performance metrics via a single graphical user interface. A processor identifies the plurality of performance metrics, identifies predicted and real time values for the plurality of performance metrics and visually displays for a user the plurality of performance metrics in readable format. In some embodiments, the plurality of performance metrics are displayed in a graphical format. In other embodiments, the plurality of performance metrics are displayed in a spreadsheet format such that the different values and metrics may be arranged into a plurality of different combinations. Further, the processor determines the actual values for the plurality of performance metrics and may organize the visual display based on the current data, a change in data, and/or any other of a plurality of combinations.

As such, the process described herein, in identifying the plurality of performance metrics, generating data corresponding to the plurality of performance metrics, and providing or transmitting the data to an external device that uses the data to surface or arrange the data into the plurality of different visual combinations or otherwise indicate a series of the plurality of performance metrics improves the functioning of the external device in providing the most relevant information to a user in a single resource. That is, displaying of the plurality of performance metrics as a result of the processes described herein may only cater to or boost a particular metric of the plurality of performance metrics to meet a particular user's search needs.

It should be appreciated that the systems and methods for establishing a bonafide lead from a potential lead and other systems and methods are described in U.S. patent application Ser. No. 17/025,678, which is hereby incorporated by reference in its entirety. Further, it should be appreciated that the systems and methods for closing the sales and other systems and methods are described in U.S. patent application Ser. No. 17/025,772, which is hereby incorporated by reference in its entirety Various systems and methods for identifying and generating a plurality of values for a plurality of performance metrics for display by mining other databases, text, and the like, are described in detail herein.

Figure 1:
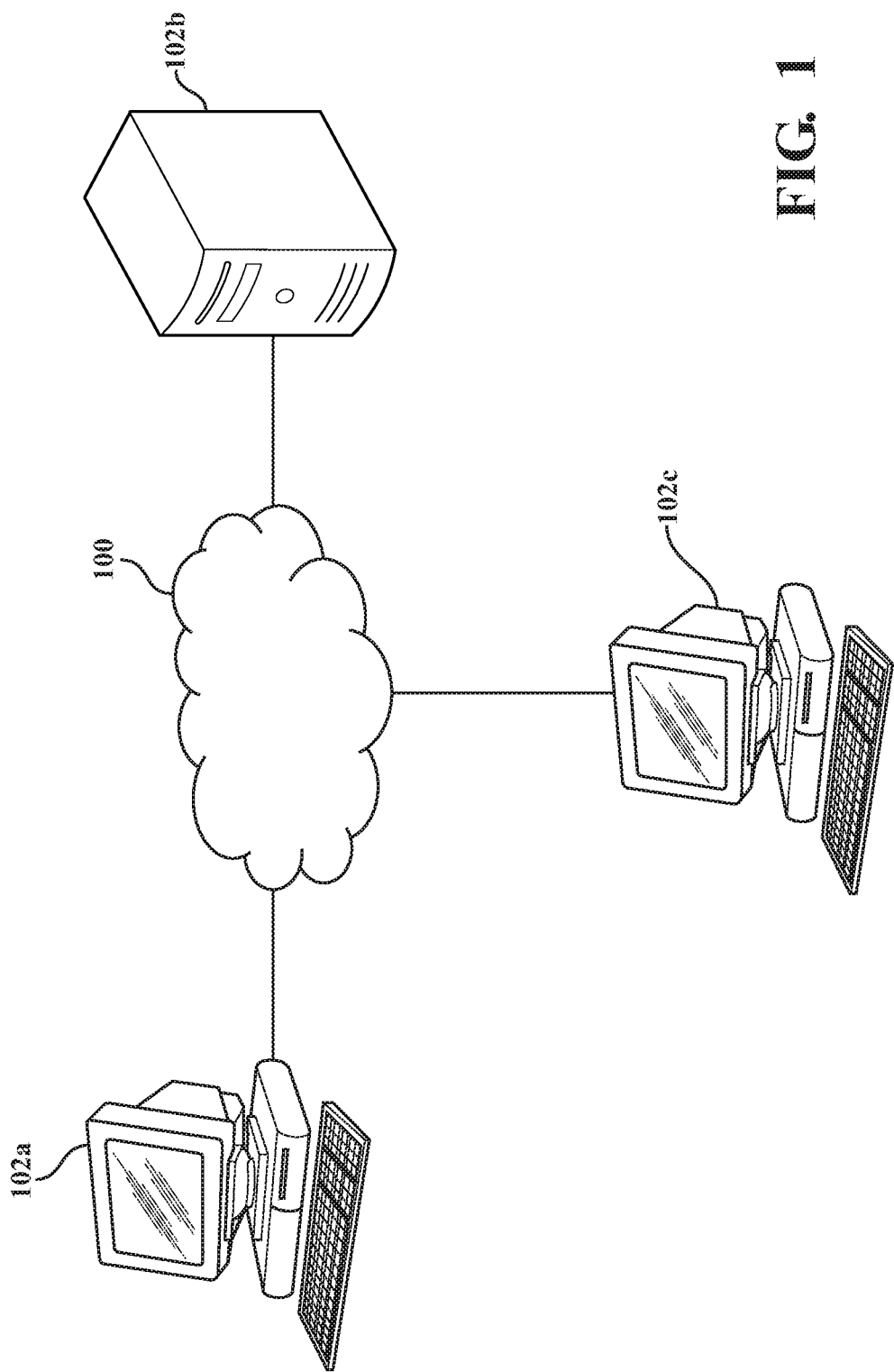
FIG. 1 schematically depicts an illustrative computing network for a system for mining data to identify one or more particular sales metrics according to one or more embodiments described and illustrated herein.

Referring now to the drawings, FIG. 1 depicts an illustrative computing network that depicts components for a system for mining databases to identify and generate a plurality of values for a plurality of performance metrics for display, according to embodiments shown and described herein. As illustrated in FIG. 1, a computer network 100 may include a wide area network (WAN), such as the internet, a local area network (LAN), a mobile communications network, a public service telephone network (PSTN) a personal area network (PAN), a metropolitan area network (MAN), a virtual private network (VPN), and/or another network. The computer network 100 may generally be configured to electronically connect one or more computing devices and/or components thereof. Illustrative computing devices may include, but are not limited to, a user computing device 102a, a data mining device 102b, and an administrator computing device 102c.

The user computing device 102a may generally provide an interface between a user and the other components connected to the computer network 100. Thus, the user computing device 102a may be used to perform one or more user-facing functions, such as receiving one or more inputs from a user or transmitting data or information such as data related to initiating an electronic search query for displaying a plurality of performance metrics. More specifically, to perform an electronic search query, the user computing device 102a may present a user with a user interface that allows the user to enter or request values for the plurality of performance metrics to be searched and/or displayed. The user interface may be configured to receive a search request from the user, initiate the search, and utilize data received from the data mining device 102b when displaying search results, as described in greater detail herein. The search request may include terms and/or other data for retrieving a data related to the plurality of metrics, such as when a sales person connected to the computer network 100 makes or completes a sale of a product or service. The components and functionality of the user computing device 102a will be set forth in detail below.

Additionally, included in FIG. 1 is the administrator computing device 102c. In the event that the data mining device 102b requires oversight, updating, or correction, the administrator computing device 102c may be configured to provide the desired oversight, updating, and/or correction. The administrator computing device 102c may also be used to input additional data into a data storage portion of the data mining device 102b. For example, the administrator computing device 102c may edit the plurality of performance metrics for display, where to gather the data, where to display the data, and the like.

The data mining device 102b may search and/or monitor a plurality of external databases to identify a plurality of values for a plurality of performance metrics for display. For example, the data mining device 102b may mine or monitor for data related to when a sales person connected to the computer network 100 makes or completes a sale of a product or service. The data mining device 102b may also determine, generate, and/or identify a plurality of values for a plurality of performance metrics based on keywords or clues to identify the particular value for the plurality of values for a particular performance metric of the plurality of performance metrics. The data mining device 102b may also transmit information to the user computing device 102a such that the user computing device 102a may display the result set of plurality of values in a plurality of combinations of the plurality of performance metrics. For example, the top sales people in sales, and/or in other performance metrics are displayed at a top of the resulted visual indicator of the plurality of performance metrics and information. The data mining device 102b may provide or transmit data to an external device, such as the user computing device 102a, to surface or otherwise indicate the sales people results in a selected metric of the plurality of performance metrics and in a selected order. The components and functionality of the data mining device 102b will be set forth in detail below.

It should be understood that while the user computing device 102a and the administrator computing device 102c are depicted as personal computers and the data mining device 102b is depicted as a server, these are merely examples. More specifically, in some embodiments, any type of computing device (e.g., mobile computing device, personal computer, server, and the like) may be utilized for any of these components. Additionally, while each of these computing devices is illustrated in FIG. 1 as a single piece of hardware, this is also an example. More specifically, each of the user computing device 102a, the data mining device 102b, and the administrator computing device 102c may represent a plurality of computers, servers, databases, and the like.

In addition, it should be understood that while the embodiments depicted herein refer to a network of computing devices, the present disclosure is not solely limited to such a network. For example, in some embodiments, the various processes described herein may be completed by a single computing device, such as a non-networked computing device or a networked computing device that does not use the network to complete the various processes described herein.

Figure 2A:
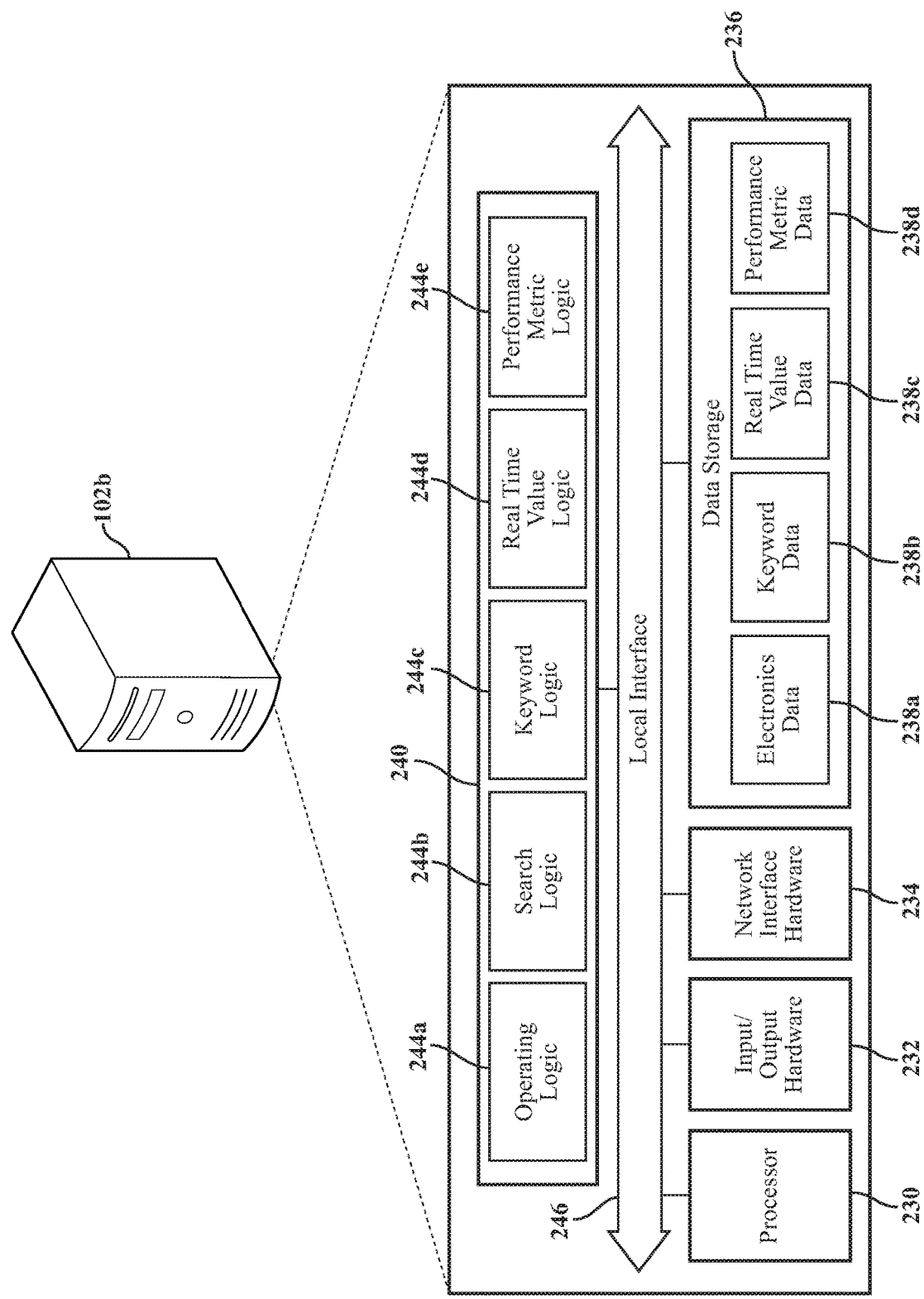
FIG. 2A schematically depicts a mining device from FIG. 1, further illustrating hardware and software components that may be used to mine data to identify, compute, and organize one or more particular sales metrics according to one or more embodiments described and illustrated herein.

FIG. 2A depicts the data mining device 102b, further illustrating a system that determines, generates, and/or identifies a plurality of values for a plurality of performance metrics by utilizing hardware, software, and/or firmware, according to embodiments shown and described herein. The data mining device 102b may include a non-transitory computer readable medium configured for monitoring, searching and/or mining, based on keywords or clues, to identify the particular value for the plurality of values for a particular performance metric of the plurality of performance metrics, and/or the like embodied as hardware, software, and/or firmware, according to embodiments shown and described herein.

While in some embodiments, the data mining device 102b may be configured as a general purpose computer with the requisite hardware, software, and/or firmware, in other embodiments, the data mining device 102b may be configured as a special purpose computer designed specifically for performing the functionality described herein. For example, the data mining device 102b may be a specialized device that particularly determines a plurality of values related to specific performance metrics of the plurality of performance metrics located within external devices connected to the computer network 100 (FIG. 1). In a further example, the data mining device 102b then provides the generated data list to an external component (e.g., the user computing device 102a (FIG. 1)) for the purposes of improving the accuracy of an external component when the external component executes a search and provides results to a user that in a plurality of combinations, such as, for example, ranking the sales people according to a specific of plurality of performance metrics (e.g., closes per lead, cost per lead, overall sales, and the like) or are otherwise indicated within the displayed search results.

As also illustrated in FIG. 2A, the data mining device 102b may include a processor 230, input/output hardware 232, network interface hardware 234, a data storage component 236, which stores a database of electronic data 238a, a keyword data 238b, a plurality of real time value data 238c, a plurality of performance metric data 238d, and a memory component 240. The memory component 240 may be non-transitory computer readable memory. The memory component 240 may be configured as volatile and/or non-volatile memory and, as such, may include random access memory (including SRAM, DRAM, and/or other types of random access memory), flash memory, registers, compact discs (CD), digital versatile discs (DVD), and/or other types of storage components. Additionally, the memory component 240 may be configured to store operating logic 244a, search logic 244b, keyword logic 244c, plurality of real time value logic 244d, and plurality of performance metric logic 244e (each of which may be embodied as a computer program, firmware, or hardware, as an example). A local interface 246 is also included in FIG. 2A and may be implemented as a bus or other interface to facilitate communication among the components of the data mining device 102b. It should be understood that the processor 230, memory component 240 and various logic modules such as the operating logic 244a, the search logic 244b, the keyword logic 244c, the plurality of real time value logic 244d, and the plurality of performance metric logic 244e may define a computer-program product for identifying a plurality of real time values for a plurality of performance metrics by monitoring and/or mining external databases.

The processor 230 may include any processing component(s) configured to receive and execute instructions (such as from the data storage component 236 and/or memory component 240). The input/output hardware 232 may include a monitor, keyboard, mouse, printer, camera, microphone, speaker, and/or other device for receiving, sending, and/or presenting data. The network interface hardware 234 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 236 may reside local to and/or remote from the data mining device 102b and may be configured to store one or more pieces of data for access by the data mining device 102b and/or other components, to assist in determining a plurality of values related to specific performance metrics of the plurality of performance metrics located within external devices connected to the computer network 100 (FIG. 1). As illustrated in FIG. 2A, the data storage component 236 stores a database of electronic data 238a. As mentioned above, the electronic data may include data related to the external devices on the computer network 100 (FIG. 1), the users or sales peoples, customers, leads, and the like, that have been organized and indexed for searching. The keyword data 238b stores potential keywords that may be used to identify specific data for sales metrics, to search for specific customers, sales people, a setter, a closer, an amount owed by a customer, and the like. For example, specific data may be a lead per dollar spent or a number of sales per lead generated.

The plurality of real time value data 238c may include a plurality of real time data values for the plurality of performance metrics that is constantly updating and may have been organized and indexed for searching, such as by the keyword data 238b. For example, the plurality of real time data values may be accurate data from across a plurality of remote servers that is mined, gathered, and stored in the plurality of real time value data 238c. For example, the data may be related to sales in certain regions, states, and/or cities, data related to individual or sales teams, and the like. The plurality of performance metric data 238d includes a plurality of specific performance metric data that may be used to determine a success of an individual and/or sales team based on a plurality of predetermined performance metric data. For example, performance metric data may include metrics on leads, lead status and closing of deals with respect to individual sales people and/or teams of sales people.

Included in the memory component 240 are the operating logic 244a, search logic 244b, keyword logic 244c, real time value logic 244d, and performance metric logic 244e. It should be appreciated that, in some embodiments, the operating logic 244a, search logic 244b, keyword logic 244c, real time value logic 244d, and performance metric logic 244e may each be a software module that is independent from one other and/or configured to function together to perform the illustrative methods and display the data with respect to FIGS. 3-10.

The operating logic 244a may include an operating system and/or other software for managing components of the data mining device 102b. The search logic 244b may contain programming instructions to facilitate electronic searches during a data generation process as described in greater detail herein. Further, the search logic 244b may contain programming instructions to mine the electronic databases of devices connected to the computer network 100 (FIG. 1) (e.g., the user computing device 102a) for data to provide a single resource with visibility for sales management to accurately view, track and have metrics on leads, lead status and closing of deals, and to sort, store, categorize, and/or the like any data relating to those topics, as discussed in greater detail herein. The search logic 244b may transmit data to the search computer (i.e., the user computing device 102a) so that the search computer knows which data to provide when a search request is received and a results list is generated, as discussed in greater detail herein. As such, the search computer (i.e., the user computing device 102a) has information that triggers the search computer to move or rank the requested data up to the top of the search result list or otherwise distinguish the search results (e.g., highlight, star, and/or the like) so a user knows which metrics a specific sales person or team of sales persons is distinguished in the search results or at the top of the result lists when reviewing the results list.

The keyword logic 244c may contain programming instructions to select the electronic data 238a, search the electronic data 238a, identify the real time value of the plurality of real time value data 238c, and identify specific performance metrics of the plurality of performance metric data 238d. The keyword logic 244c may save the one or more keywords as the keyword data 238b. The real time value logic 244d may contain programming instructions to identify real time data from a plurality of devices connected to the computer network 100 (FIG. 1). The real time value logic 244d may be an algorithm configured to mine a plurality of data from one or two data sources to quickly and accurately gather, mine, and/or store data in the real time value data 238c so that the plurality of data may be displayed visually in a single resource, as discussed in greater detail herein. In some embodiments, the algorithm may be configured to mine a plurality of data from Schedule Once® and/or Slack® and may utilize Zapier®. The real time value logic 244d may also function alone or with other logic modules, such as the performance metric logic 244e to calculate the values for the plurality of performance metrics that may be displayed in an easy to understand visual format, that may be organized and ranked automatically, and the like, as discussed in greater detail herein.

The performance metric logic 244e may contain programming instructions to categorize the real time value data 238c from a plurality of devices connected to the computer network 100 (FIG. 1) based on the requested or predetermined plurality of performance metric data 238d. The performance metric logic 244e may be an algorithm configured to mine a plurality of data from external sources, such as databases of external device (user computing device 102a, administrator computing device 102c and/or the like) or from the data storage component 236 such as from the electronic data 238a, the keyword data 238b, the real time value data 238c and/or the performance metric data 238d to determine the data associated with a plurality of predetermined performance metrics for an individual or a sales team. Further, the algorithm may assist in moving, ranking, highlighting, or otherwise displaying required performance metrics and the real time value within the search or result list so a user, such as a sales management, knows which metrics a specific sales person or team of sales persons is distinguished in the search results or at the top of the result lists when reviewing the results list. The performance metric logic 244e may also function alone or with other logic modules, such as the real time value logic 244d to calculate the values for the plurality of performance metrics that may be displayed in an easy to understand visual format, that may be organized and ranked automatically, and the like, as discussed in greater detail herein.

It should be understood that the components depicted in FIG. 2A are merely illustrative and are not intended to limit the scope of this disclosure. More specifically, while the components in FIG. 2A are illustrated as residing within the data mining device 102b, this is a nonlimiting example. In some embodiments, one or more of the components may reside external to the data mining device 102*b*. Similarly, while FIG. 2A is directed to the data mining device 102*b*, other components such as the user computing device 102*a* and the administrator computing device 102*c* may include similar hardware, software, and/or firmware.

Figure 2B:
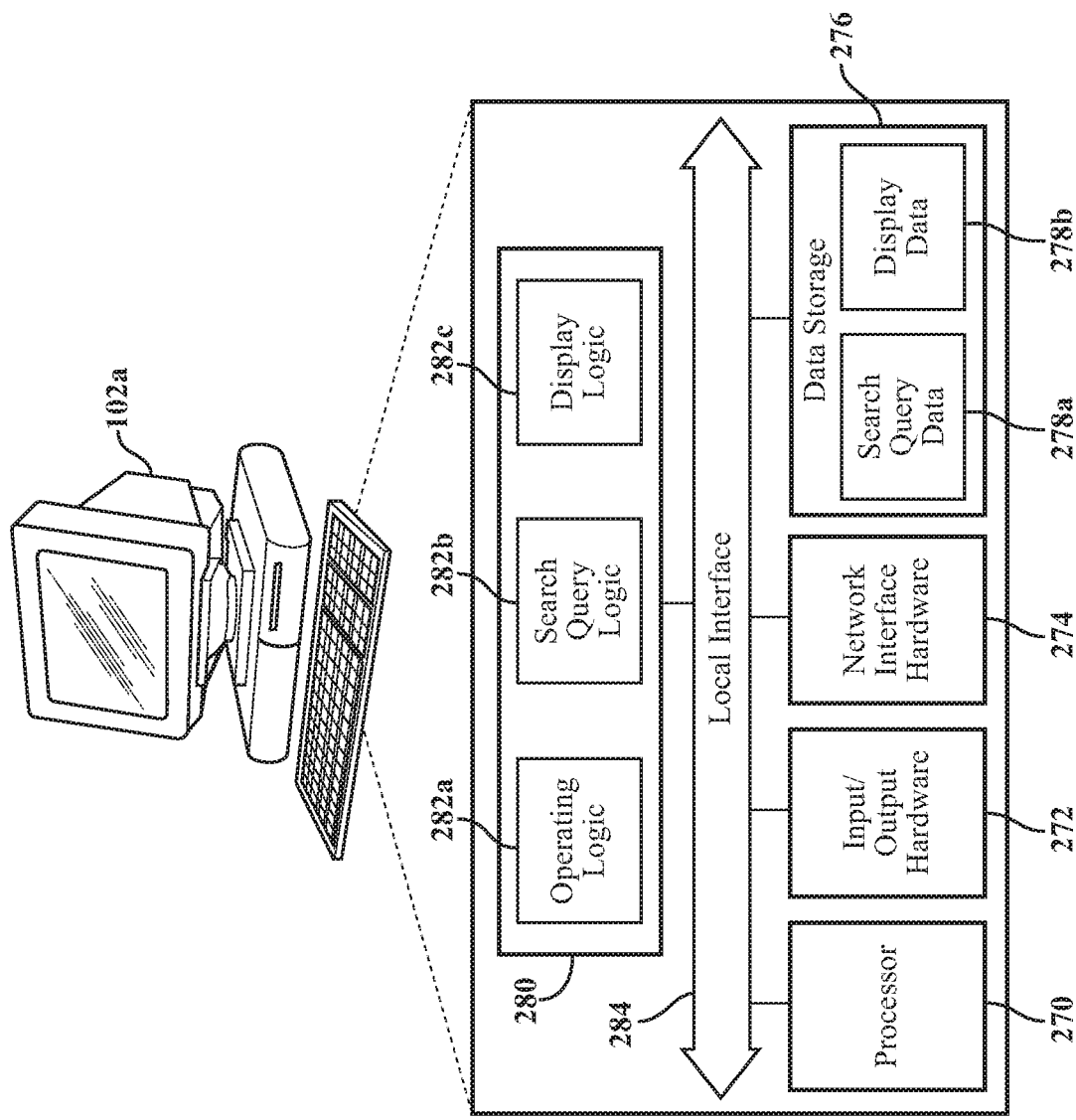
FIG. 2B schematically depicts the user computing device from FIG. 1, further illustrating hardware and software components that may be used to initiated a search query to identify data related to one or more particular sales metrics according to one or more embodiments described and illustrated herein.

FIG. 2B depicts the user computing device 102*a* further illustrating a system that identifies a search query by utilizing hardware, software, and/or firmware, according to embodiments shown and described herein. In addition, the user computing device 102*a* may include a non-transitory, computer readable medium configured for displaying and transmitting a search query initiated by a user embodied as hardware, software, and/or firmware, according to embodiments shown and described herein.

While, in some embodiments, the user computing device 102*a* may be configured as a general purpose computer with the requisite hardware, software, and/or firmware, in other embodiments, the user computing device 102*a* may be configured as a special purpose computer designed specifically for performing the functionality described herein. For example, the user computing device 102*a* may be a specialized device that displays a user interface for inputting a search query for at least one sales performance metric for an individual and/or a sales team and displays a plurality of generated results of the search query that may be sorted into a plurality of combinations, such as with the top ranked individual sales person and/or sales team at the top or otherwise distinguishable, filtered or based on a minimum and maximum value, and/or the like, for the purposes of improving the accuracy of the sales performance metrics search results that are provided to a user, such as sales management, to track, identify and determine the performance metrics of a plurality of remote users.

As also illustrated in FIG. 2B, the user computing device 102*a* may include a processor 270, input/output hardware 272, network interface hardware 274, data storage component 276, which stores a database of search query data 278*a* and display data 278*b*, and a memory component 280. The memory component 280 may be non-transitory computer readable memory. The memory component 280 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component 280 may be configured to store operating logic 282*a*, search query logic 282*b*, and display logic 282*c* (each of which may be embodied as a computer program, firmware, or hardware, as an example). A local interface 284 is also included in FIG. 2B and may be implemented as a bus or other interface to facilitate communication among the components of the user computing device 102*a*.

The processor 270 may include any processing component(s) configured to receive and execute instructions (such as from the data storage component 276 and/or memory component 280). The input/output hardware 272 may include a monitor, keyboard, mouse, printer, camera, microphone, speaker, and/or other device for receiving, sending, and/or presenting data. The network interface hardware 274 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 276 may reside local to and/or remote from the user computing device 102*a* and may be configured to store one or more pieces of data for access by the user computing device 102*a* and/or other components, store data that may be received from an external device (e.g., the data mining device 102*b*) such as the search query data 278*a*, and/or store data to be displayed. As illustrated in FIG. 2B, the data storage component 276 stores a database of search query data 278*a*. As mentioned above, the search query data 278*a* may include data related to a searched sales performance metric and/or data received from an external device (i.e., the data mining device 102*b*). The display data 278*b* may include data relating to the data to be displayed. For instance, the display data 278*b* may include the order or otherwise distinguished sales performance metrics, individuals and/or sales team members to be displayed on the user computing device 102*a*, such as from the data mining device 102*b*.

Included in the memory component 280 are the operating logic 282*a*, search query logic 282*b*, and display logic 282*c*. The operating logic 282*a* may include an operating system and/or other software for managing components of the user computing device 102*a*. The search query logic 282*b* may contain programming instructions to facilitate user initiated electronic searches or queries. The search query logic 282*b* may be configured to compile, organize, and/or display electronic data into an order, such as at the top of a search result list or otherwise indicate and/or distinguish a plurality of sales performance metrics based on a real time value data that is recognizable when displayed to a user, such as a sales management member. The search query logic 282*b* may also be configured to provide data for a user interface to or a display device of the user computing device 102*a*.

The display logic 282*c* may display a graphical user interface usable by a user of the user computing device 102*a* to provide electronic data search queries, to display visualizations of a plurality of metadata associated with the sales performance metrics, the real time value data, and the like. The display logic 282*c* may generally be configured to display information on a display of the user computing device 102*a*. The functionalities of the operating logic 282*a*, the search query logic 282*b*, and the display logic 282*c* will be described in further detail below.

It should be understood that the components depicted in FIG. 2B are merely illustrative and are not intended to limit the scope of this disclosure. More specifically, while the components in FIG. 2B are illustrated as residing within the user computing device 102*a*, this is a nonlimiting example. In some embodiments, one or more of the components may reside external to the user computing device 102*a*. Similarly, while FIG. 2B is directed to the user computing device 102*a*, other components such as the administrator computing device 102*c* may include similar hardware, software, and/or firmware.

Figure 3:
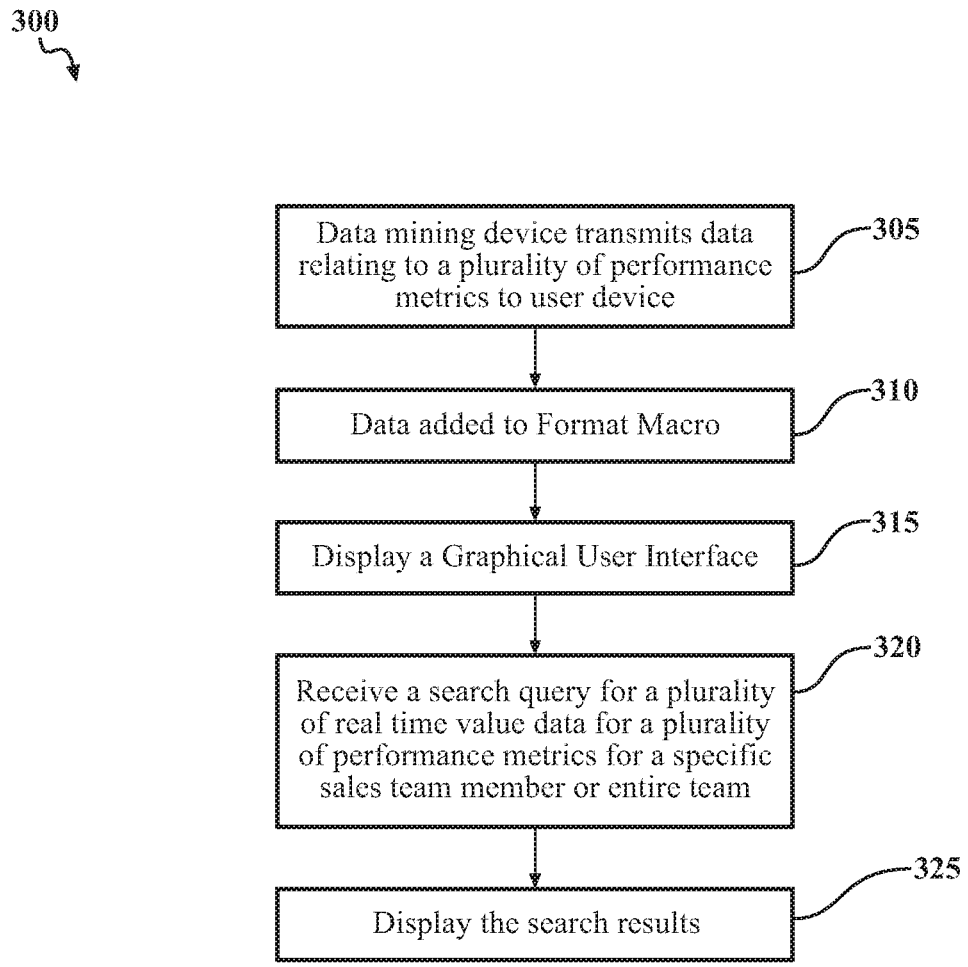
FIG. 3 depicts a flow diagram of an illustrative method of facilitating a performance metric search query according to one or more embodiments described and illustrated herein.

Referring now to FIG. 3, a flow diagram that graphically depicts an illustrative method 300 of facilitating a performance metric search query is provided. Although the steps associated with the blocks of FIG. 3 will be described as being separate tasks, in other embodiments, the blocks may be combined or omitted. Further, while the steps associated with the blocks of FIG. 3 will described as being performed in a particular order, in other embodiments, the steps may be performed in a different order.

Still referring to FIG. 3, at block 305, the data mining device 102*b* (FIG. 1) may transmit data relating a plurality of performance metrics to the user computing device 102*a* (FIG. 1). The transmitted data or information from the data mining device 102*b* (FIG. 1) to the user computing device 102a (FIG. 1) includes a plurality of real time value data for the plurality of performance metrics. The plurality of performance metrics may be predetermined. Further, the user computing device 102a (FIG. 1) may be instructed or other know which of the plurality of performance metrics and the plurality of real time value data to move to the top of the search results list or otherwise indicate or distinguish. That is, the data mining device 102b (FIG. 1) may generate data or information to be displayed with the display logic 282c (FIG. 2B). It should be appreciated that the transmitted data from the data mining device 102b (FIG. 1) has already been compiled by the data mining device 102b (FIG. 1) previous to any search request and that the data mining device 102b (FIG. 1) may automatically transfer the data at predetermined times and/or intervals.

At block 310, the transmitted data or information from the data mining device 102b (FIG. 1) to the user computing device 102a (FIG. 1) is added to a formatting macro. The formatting macro converts, normalizes, or otherwise changes the transmitted data into a data that is able to be readable.

At block 315, a graphical user interface is displayed. In some embodiments, the graphical user interface is displayed on a display device of the user computing device 102a (FIG. 1). The graphical user interfaces described herein may display the plurality of performance metrics and the associated or corresponding plurality of real time values for each performance metric in an intuitive and user-friendly manner such that each sales team member and/or team may be queried may be displayed.

Still referring to FIG. 3, at block 320, a search query may be generated by the user based on the selected determined type of payment action for the one or more sales team members from the working corpus of data or the selected plurality of real time data for the selected one or more performance metrics for the one or more sales team members and is received by the user computing device 102a (FIG. 1). In some embodiments, the search query received at block 320 may have been entered into a query input or field of search of the graphical user interface displayed by the user computing device 102a (FIG. 1). The user interface may be configured to receive a search request from the user and to initiate the search. Once the search query is received, the user computing device 102a (FIG. 1), in response to initiation of the search by the user (i.e., by pressing enter or selecting a search initiation icon or by entering text, which is automatically searched), may perform a search query for the data or information relating to the plurality of real time value data for the plurality of performance metrics for a specific sales team member or the entire team that a user is querying and display the search results at block 325. In some embodiments, the search results may use the data received from the data mining device 102b (FIG. 1) such that specific sales team members who are above predetermined values for specific performance metrics may be moved to a top of a search result listing or otherwise be indicated or distinguished from the sales members in search results. In other embodiments, specific sales team members who are at or below predetermined values for specific performance metrics may be moved to a top of a search result listing or otherwise be indicated or distinguished from the sales members in search results.

Figure 4:
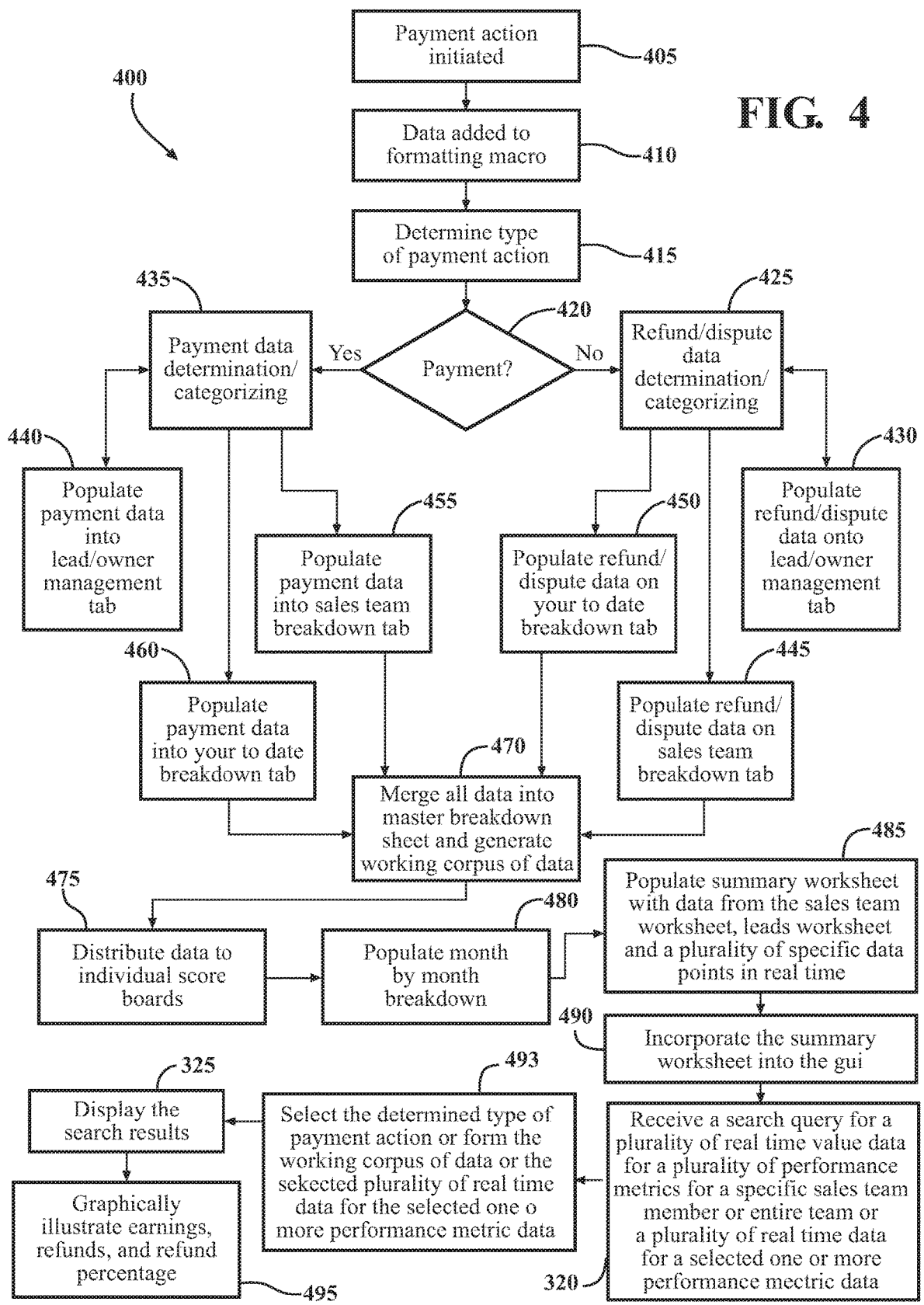
FIG. 4 depicts a flow diagram of an illustrative method of determining, generating, and/or identifying a plurality of values for a plurality of performance metrics according to one or more embodiments described and illustrated herein.

Referring now to FIG. 4, a flow diagram that graphically depicts an illustrative method 400 of determining, generating, and/or identifying a plurality of values for a plurality of performance metrics is provided. Although the steps associated with the blocks of FIG. 4 will be described as being separate tasks, in other embodiments, the blocks may be combined or omitted. Further, while the steps associated with the blocks of FIG. 4 will described as being performed in a particular order, in other embodiments, the steps may be performed in a different order.

Still referring to FIG. 4, at block 405, a payment action initiation occurs. The payment action initiation may occur by an external device connected to the computer network 100 (FIG. 1) such as any one of a plurality of sales team members. Further, in some embodiments, the payment action initiation occurring may be detected by the data mining device 102b (FIG. 1), which may transfer data relating to the particular action initiation to the user computing device 102a (FIG. 1), as discussed in greater detail herein. In other embodiments, the payment action initiation occurring may be pushed to the data mining device 102b (FIG. 1), which may transfer data relating to the particular action initiation to the user computing device 102a (FIG. 1), as discussed in greater detail herein.

The transmitted data or information from the data mining device 102b (FIG. 1) to the user computing device 102a (FIG. 1) is for the user computing device 102a (FIG. 1) to know which where to populate the data and which data to move to the top of the search results list or otherwise indicate or distinguish a plurality of performance metrics with real time value data from other real time value data in the same plurality of performance metrics. That is, the data mining device 102b (FIG. 1) may generate data or information to be displayed with the display logic 282c (FIG. 2B). It should be appreciated that, in some embodiments, the transmitted data from the data mining device 102b (FIG. 1) has already been compiled by the data mining device 102b (FIG. 1) previous to any search request and that the data mining device 102b (FIG. 1) may automatically transfer the data at predetermined times and/or intervals.

Still referring to FIG. 4, at block 410, the transmitted data or information from the data mining device 102b (FIG. 1) to the user computing device 102a (FIG. 1) is added to a formatting macro. The formatting macro converts, normalizes, or otherwise changes the transmitted data into a data that is able to be readable. The data is then determined to identify which type of payment action was initiated, at block 415. If the data is determined to not be a payment, at block 420, then then the data is determined as refund/dispute data and categorized, at block 425, the refund/dispute data is populated onto the lead/owner management worksheet, at block 430, the refund/dispute data is populated onto the sales team breakdown worksheet, at block 450, and the refund/dispute data is populated onto the year to date breakdown worksheet, at block 445.

If the data is determined to be a payment, at block 420, then then the data is determined as payment data and categorized, at block 435, the payment data is populated onto the lead/owner management worksheet, at block 440, the payment data is populated onto the sales team breakdown worksheet, at block 455, and the payment data is populated onto the year to date breakdown worksheet, at block 460.

Once the refund/dispute data is populated onto the sales team breakdown worksheet, at block 450, the refund/dispute data is populated onto the year to date breakdown worksheet, at block 445, and/or the payment data is populated onto the sales team breakdown worksheet, at block 455, and the payment data is populated onto the year to date breakdown worksheet, at block 460, then all the data is now merged onto a master breakdown sheet, at block 470, and to generate a working corpus of data. The data is then distributed to the individual scoreboards, at block 475, and populated onto other worksheets such as a month-by-month worksheet, at block 480, and a summary worksheet, at block 485. The summary worksheet is populated with data from the sales team worksheet, leads worksheet, and a plurality of specific data points in real time that may be gather or mined by the data mining device 102b to gather the necessary data from a plurality of sources (e.g. different user computing devices of the sales members). The summary worksheet is incorporated into the graphical user interface, at block 490, to provide a user with a single resource to visually or graphical see all the data.

Still referring to FIG. 4, at block 320, a search query may be generated by the user based on the selected determined type of payment action for the one or more sales team members from the working corpus of data or the selected plurality of real time data for the selected one or more performance metrics for the one or more sales team members and is received by the user computing device 102a (FIG. 1). In some embodiments, the search query received at block 320 may have been entered into a query input or field of search of the graphical user interface displayed by the user computing device 102a (FIG. 1). The user interface may be configured to receive a search request from the user and to initiate the search. Once the search query is received, the user computing device 102a (FIG. 1), in response to initiation of the search by the user (i.e., by pressing enter or selecting a search initiation icon or by entering text, which is automatically searched), may perform a search query for the data or information relating to the plurality of real time value data that is now categorized and populated into the plurality of performance metrics.

At block 493 the data for the search query for the selected determined type of payment action for the one or more sales team members from the working corpus of data or the selected plurality of real time data for the selected one or more performance metrics for the one or more sales team members and is received or retrieved by the user computing device 102a (FIG. 1). Once the search query and data are received, the user computing device 102a (FIG. 1), in response to initiation of the search by the user (i.e., by pressing enter or selecting a search initiation icon or by entering text, which is automatically searched), may perform a search query for the data or information relating to the plurality of real time value data for the plurality of performance metrics for a specific sales team member or the entire team that a user is querying and display the search results at block 325.

Further, in some embodiments, at block 495, the search results are graphically displayed. The search results may use the data received from the data mining device 102b (FIG. 1) to indicate which of the populated data to move to the top of the search results list or otherwise indicate or distinguish with respect to the plurality of performance metrics with real time value data from other real time value data in the same plurality of performance metrics. In some embodiments, the graphical user interface is displayed on a display device of the user computing device 102a (FIG. 1). The graphical user interfaces described herein may display all the populated data in an intuitive and user-friendly manner such that certain data may be moved to the top of the search results list or otherwise indicated or distinguished with respect to the plurality of performance metrics with real time value data from other real time value data in the same plurality of performance metrics. In some embodiments, the computer network 100 is the Internet and the graphical user interfaces described herein are presented to the user on a display device of the user computing device 102a via a web browser.

Referring now to FIGS. 5-9, the graphical user interface 500 includes a plurality of worksheets, each corresponding to a sheet that contains a plurality of sales metrics and is populated with a plurality of real time value data. It should be appreciated that the plurality of worksheets corresponding to the sheet form or define the graphical user interface 500.

Referring now to FIG. 5, a partial view of a leads worksheet 505 is schematically depicted. The leads worksheet 505 is where imported data is populated relating to contact and potential lead information is displayed. In some embodiments, the data of the leads worksheet may be automatically populated using the data mining device 102b (FIG. 1). In other embodiments, the data mining device 102b (FIG. 1) may use software, such as Zapier®, or other software that may interface with the potential lead, such as Schedule Once® and Slack®.

The leads worksheet 505, amongst other data, includes a booking date category 510, a booking time category 515, a campaign category 520, an assigned category 525, a biographically category 530, a resolution category 535, a day/time booked category 540, and/or a pay period category 545. It should be appreciated that the data identified, mined and/or determined by the data mining device 102b (FIG. 1) may be placed into one of these categories of the leads worksheet. The booking date category 510 may include and display data relating to a date of a sales call appointment that has been booked by the potential lead in Schedule Once®. The booking time category 515 may include and display data relating to a specific booking time for the closer/sales representative to attend the call in the time zone of the closer/sales representative.

The campaign category 520 may include and display data relating to a booking page name from Schedule Once®, such that metrics for any funnels that the company may be using may be discovered and changing the booking page name permits the pull in of metrics to see data on multiple funnels. As such, the campaign category 520 may be where the name of the booked conference between the client and sales team as there may be a plurality of different types of bookings and metrics for each type. For example, the booking calendars from Schedule Once® may be a strategy session, a strategy session 1, a strategy session 2 and the like, where each of these bookings come from a different funnel source. As such, the system is configured to pull metrics based on the booking name, which funnel the lead came from and determine the real time data for each type of campaign category 520 to determine how each specific type of campaign category 520 is performing based on leads and sales.

The assigned category 525 may include and display data relating to the actual closer/sales representative assigned to the potential lead. This category permits for metric pulls for the specific closer/sales representative for a variety of other metrics and data points. The biographically category 530 may include and display data relating to the name of the potential lead, a phone number and an email address for the potential lead. This category permits metric pulls for marketing purposes, or when it might not be a good time to call the client. The resolution category 535 may include and display data relating to a visualization of the disposition of the potential lead such as whether the potential lead qualifies as a bonafide lead, whether the potential lead is not a fit or opted to not move forward in the process, and the like.

Still referring to FIG. 5, the day/time booked category 540 may include and display data relating to the date the sales call meeting was scheduled automatically by the potential lead to receive a phone call from the closer/sales representative so it may be determined how far out potential leads are booking from the date they signed up and the actual time and date of their scheduled call. Metrics from this are ran to see how many bookings were made on a specific date. The pay period category 545 may include and display data relating to a payout cadence for the each closer/sales representative of the sales team. The value in the pay period category 545 may change with each pay period to assist in calculating payouts. In some embodiments, the leads worksheet 505 may include a client time zone category that may include and display data relating to which region the potential lead resides in.

Referring now to FIGS. 6A-6B, a partial view of a summary worksheet 605 is schematically depicted. The summary worksheet 605 is where imported data is populated relating to a broad stroke of metrics for quick visibility as to how the sales team is doing, both individually and as a whole. It should be appreciated that the summary worksheet 605 provides metrics for breakouts of specific data points that are pulled into multiple segments. In some embodiments, the data of the summary worksheet 605 may be automatically populated using the data mining device 102*b* (FIG. 1). In other embodiments, the data mining device 102*b* (FIG. 1) may use software, such as Zapier®, or other software that may interface with the potential lead, such as Schedule Once® and Slack®. Further, in other embodiments, the data mining device 102*b* (FIG. 1) and/or the user computing device 102*a* (FIG. 1) may populate portions of the summary worksheet 605 with data that is populated in the leads worksheet 505 (FIG. 5) and/or the sales team breakdown worksheet 705 (FIG. 7), as described in greater detail herein.

The summary worksheet 605, amongst other data, includes four segments for easy visualization. The four segments are displaying data with respect to weekly, yearly marks, month marks and/or monthly marks by advisor, as discussed in greater detail herein. With respect to FIGS. 6A-6B, the weekly segment is schematically depicted. The summary worksheet 605 includes a week category 610, a sales team member category 612, a total leads category 615, an amount collected category 620, a dollars per lead category 625, a total contacts lead category 630, a dollars per lead talked to category 635, and a resolutions category 640. The week category 610 may include and display data relating to a visualization of the current week that the plurality of real time value data corresponds to in the various categories of the summary worksheet 605. Further, each specific closer/sales representative of the sales team may be sorted and compared based on the categories of the summary worksheet for any given week.

The total leads category 615 may include and display data relating to the number of potential leads assigned in the specific time period or person in that segment (monthly, weekly or Yearly). The amount collected category 620 may include and display data relating to the total revenue collected for specific closer/sales representative and/or time period. The dollars per lead category 625 may include and display data relating to the dollars per lead brought in for that time period and/or by specific closer/sales representative person. The dollars per lead may be determined by the following equation:

$$\frac{\text{amount collected}}{\text{total leads}}.$$

The total contacts lead category 630 may include and display data relating to the total number of leads minus no-shows or canceled appointments. The dollars per lead talked to category 635 may include and display data relating to actual leads that the specific closer/sales representative person was actually able to speak with. The resolutions category 640 may include and display data relating to dispositions of potential leads for each specific closer/sales representative person. For example, dispositions of potential leads may include a deposits taken category 645, a purchased/paid in full category 650, a no purchase category 655, a no money category 660, a no show category 665, a called once category 670, a called twice category 675, a sets category 680, a working category 685, such as when the sales team member selects when an initial call with the potential lead has occurred, but the deal has not been won or lost at this time, which would allow a reminder to follow up with the potential lead at some other time. Further, the dispositions of potential leads may include, an initial call schedule category 690, and/or a rescheduled category 695. The resolutions category 640 provides data on how each specific closer/sales representative person handle customer relationship management, visually view how each specific closer/sales representative person is resolving their assigned potential leads, and visually determine whether there is any pattern to no show/canceled leads for each specific closer/sales representative person.

As discussed above the other segments, include the yearly marks segment that may include and display data relating to a visualization of each specific closer/sales representative person for the year to date is displayed. This is a calculation of all the leads each specific closer/sales representative person have been assigned and broken out to how their numbers look for the year. That is, the year to date worksheet includes the plurality of leads for each specific team member of the one or more sales team members that have been assigned and are visually displayed for a user to view a year-to-date comparison with other specific team member of the one or more sales team members. This allows to see patterns, compare percentages and other performance metrics to colleagues across the world, and the like. The monthly marks segment may include and display data relating to the company as a whole and not specific to specific closer/sales representative person for each month of the year. This may be a combination of all the specific closer/sales representative person data on the summary worksheet 605 displayed as an easy to read and visualize format to gauge the company as a whole for the month based on the data contained in the summary worksheet 605. Further, the monthly marks by advisor segment may include and display data relating to each specific closer/sales representative person is performing for each month of the year.

Referring now to FIG. 7, a partial view of a sales team breakdown worksheet 705 is schematically depicted. The sales team breakdown worksheet 705 includes a data transfer portal so that data may be transformed into the formats needed to visually display the data on the graphical user interface 500. That is, because some of the data may be mined by the data mining device 102*b* (FIG. 1) using software, such as Zapier®, the data is not in a macro format and needs to be normalized, converted, and/or the like, such that the data may be moved between the various worksheets of the graphical user interface 500, as discussed in greater detail herein. That is, in embodiments, the data mining device 102*b* (FIG. 1) may use software, such as Zapier®, or other software that may interface with the potential lead, such as Schedule Once® and Slack® to populate portions of the summary worksheet 605 (FIG. 6A) and/or the leads worksheet 505 (FIG. 5), as described in greater detail herein. As such, a plurality of sales data may be transformed into a format to visually display the plurality of sales data on the graphical user interface 500 in real time.

The sales team breakdown worksheet 705, amongst other data, includes a month category 710, a week category 715, a pay period category 720, a date category 725, a client name category 730, an amount collected category 735, a setter/closer category 740, an e-mail category 745, a left to pay category 750 and a notes/data string category 755.

The month category 710 may include and display data relating to a visualization of the numerical month the deal was closed. The week category 715 may include and display data relating to a visualization of the numerical week the deal was closed. The pay period category 720 may include and display data relating to a visualization of the pay period the deal was closed. The date category 725 may include and display data relating to a visualization of the numerical date the deal was closed. The client name category 730 may include and display data relating to a visualization of the name of the customer. The amount collected category 735 may include and display data relating to a visualization of the numerical value of the amount of money that was collected on that specific date and transaction. Further, it should be appreciated that for payment plans, the customer may show multiple times on the sales team breakdown worksheet 705, but each time will be for the amount collected on that day.

The setter/closer category 740 may include and display data relating to a visualization of the name of the setter and closer assigned to the deal of the specific client. It should be appreciated that each of the setter and the closer may have their own line and the volume tor total purchased of the deal is split between the two lines (i.e., the total of both lines equals the total of the deal). The e-mail category 745 may include and display data relating to a visualization of the e-mail address of the customer. The left to pay category 750 may include and display data relating to a visualization of any amount the customer might have left to pay. The notes/data string category 755 may include and display data relating to a visualization of the notes. Packages, setter, closer, terms of service signed, amount paid, and/or the like.

Referring now to FIG. 8, a partial view of a pay period worksheet 805 is schematically depicted. The pay period worksheet 805 includes information that is pulled from the metrics of the specific closer/sales representative (i.e., data pulled from the leads worksheet 505 (FIG. 5), the sales team breakdown worksheet 705 (FIG. 7), and the like) to visually see the history of each specific closer/sales representative payouts. As such, a comparison for each specific closer/sales representative to the sales team as a whole may be performed and/or each specific closer/sales representative may be ranked according to the sales team as a whole.

The pay period worksheet 805 includes, based on a particular closer 807, a pay period break-out category 810, a pay out week number category 815, a total leads category 820, a total collected category 825, a dollar per lead category 830, a deal count category 835, a deal refunded category 840, and an amount refunded category 845. Further, the pay period worksheet 805 includes, based on a team 847, a team leads category 850, a team collection category 855, a team DPL category 860, a leads removed category 865, a total refunded category 870 and a total refunded amount category 875. The pay period break-out category 810 may include and display data relating to a visualization of the pay period date for a given period of time, such as an entire year. The pay out week number category 815 may include and display data relating to a visualization of the pay period category 545 on the leads worksheet 505 (FIG. 5). The total leads category 820 may include and display data relating to a visualization of the total number of leads provided to the specific closer/sales representative for the specific pay period.

The total collected category 825 may include and display data relating to a visualization of the amount of fees the specific closer/sales representative collected for the specific pay period. The dollar per lead category 830 may include and display data relating to a visualization of the dollar per lead spent to collect the fees collected for the specific closer/sales representative during the specific pay period. The deal count category 835 may include and display data relating to a visualization of the number of deals or closes each specific closer/sales representative was involved during the specific pay period. The deal refunded category 840 may include and display data relating to a visualization of the number of deals or closes each specific closer/sales representative was involved during the specific pay period. The amount refunded category 845 may include and display data relating to a visualization of the amount of fees refunded by the specific closer/sales representative during the specific pay period.

The team leads category 850 may include and display data relating to a visualization of the total number of leads for the entire team for the specific pay period. The team collection category 855 may include and display data relating to a visualization of the total volume of fees collected by the entire team for the specific pay period. The team DPL category 860 may include and display data relating to a visualization of the total dollar per lead for the entire team for the number the specific pay period. The leads removed category 865 may include and display data relating to a visualization of a count of any leads that were booked but then removed from the total count of leads that would feed into the DPL (dollar per lead) data. For example, a lead may be removed if the lead is a duplicate booking or if it was deemed an obvious bogus lead where the potential lead has no intention to follow through with a call, such as naming themselves as a vulgar name or after a cartoon character. As such, these leads would be excluded, or would count toward the DPL for the sales team member or sales team.

The total refunded category 870 may include and display data relating to a visualization of the total number of refunds for the team during the specific pay period. The total refunded amount category 875 may include and display data relating to a visualization of the total amount of money refunded for the team during the specific pay period.

Referring now to FIG. 9, a partial view of a world breakdown sales worksheet 905 is schematically depicted. The world breakdown sales worksheet 905 includes data related to sales throughout the world, at different regions to know whether the specific regions are converting well or not converting for the sales team. As such, the world breakdown sales worksheet 905 is a visual indicator for marketing purposes. The world breakdown sales worksheet 905 may be populated with portions of data from the sales team breakdown worksheet 705 (FIG. 7) and/or the leads worksheet 505 (FIG. 5), as described in greater detail herein.

The world breakdown sales worksheet 905, amongst other data, includes a region category 910 and a plurality of sales categories 915 that define why the potential lead did or did not purchase the sales product. For example, the plurality of sales categories 915 may include an online purchased heading 920, a live purchased heading 925, a lead didn't see value heading 930, a lead had no money heading 935, a lead canceled call heading 940, a lead no show heading 945, a lead working heading 950, a lead appointment scheduled heading 955, a deposit made heading 960, a total leads category 965, an amount collected category 970, and a dollar per lead category 975. Each of the headings and categories correspond to a specific region, for example. Puerto Rico, Russia, Qatar, and the like. The world breakdown sales worksheet 905 provides an easy to read visual of complicated data to quickly determine whether certain sales practices work in certain areas, marketing improvements, and the like.

In some embodiments, the graphical user interface 500 further includes a deleted worksheet. The deleted worksheet includes data of any leads that are removed from the leads worksheet 505 (FIG. 5). As such, it is possible to visually track any patterns. It should be appreciated that the data within the deleted worksheet may include duplicate leads or canceled bookings.

In some embodiments, the graphical user interface 500 further includes a sales zap worksheet. The sales zap worksheet is configured as an interface between software such as connecting Zapier® to Slack®. The sales zap worksheet is a pull of information for the closing of deals.

Figure 10:
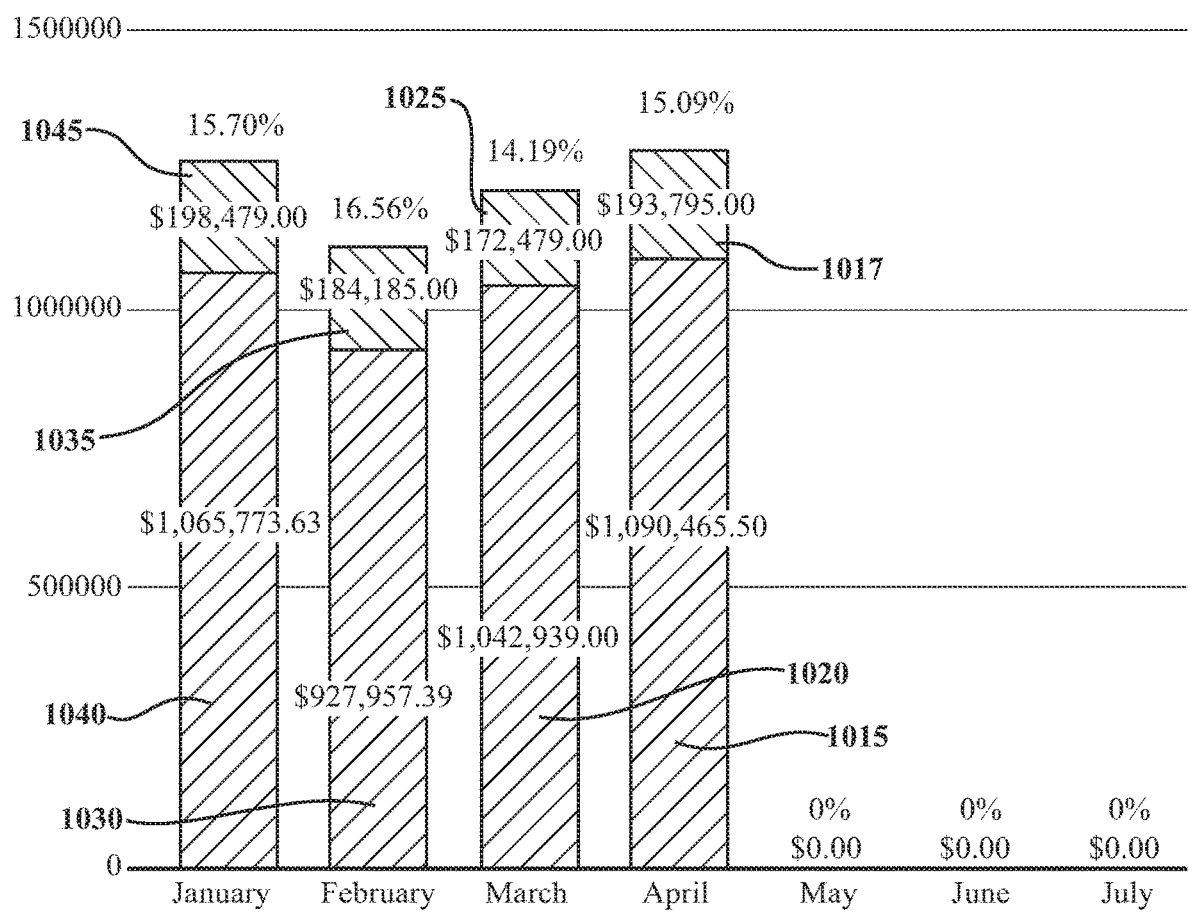
FIG. 10 schematically depicts a partial view of a month-to-month sales team refund graphic according to one or more embodiments described and illustrated herein.

Referring now to FIG. 10, a partial view of a month-to-month sales team refund graphic 1010 is schematically depicted. The month-to-month sales team refund graphic 1010 graphically illustrates a total sales team revenue for January, February March and April and a corresponding refund amount and percentage of refunds for these months. For Example, April graphically illustrates a total revenue amount 1015 and a refund amount 1025 and a percentage of 15.09% is graphically displayed for quick and easily visual reference by the sales management team. Similarly, March is graphically illustrated with a total revenue amount 1020 and a refund amount 1025 and a percentage of 14.19%, February is graphically illustrated with a total revenue amount 1030 and a refund amount 1035 and a percentage of 16.56% and January is graphically illustrated with a total revenue amount 1040 and a refund amount 1045 and a percentage of 15.70%.

It should be appreciated that the disclosed systems and methods for monitoring and visualizing a plurality of performance metrics via a single graphical user interface. A plurality of performance metrics are identified for an individual or a sales team that is located throughout the world and predicted and real time values for the plurality of performance metrics are visually displays for sales team management in readable format. In some embodiments, the plurality of performance metrics are displayed in a graphical format. In other embodiments, the plurality of performance metrics are displayed in a spreadsheet format such that the different values and metrics may be arranged into a plurality of different combinations. Further, the actual values for the plurality of performance metrics and may organize the visual display based on the current data, a change in data, and/or any other of a plurality of combinations. As such, the process described herein, in identifying the plurality of performance metrics, generating data corresponding to the plurality of performance metrics, and providing or transmitting the data to an external device that uses the data to surface or arrange the data into the plurality of different visual combinations or otherwise indicate a series of the plurality of performance metrics improves the functioning of the external device in providing the most relevant information to the sales team management in a single resource. That is, displaying of the plurality of performance metrics as a result of the processes described herein may only cater to or boost a particular metric of the plurality of performance metrics to meet a particular user's search needs.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system to provide a single resource for identifying one or more performance metric data and a plurality of real time data thereof, the system comprising:
   a processing device; and
   a non-transitory, processor-readable storage medium in communication with the processing device, the non-transitory, processor-readable storage medium comprising one or more programming instructions that, when executed, cause the processing device to:
      obtain a payment action initiation that is initiated external to the processing device;
      add a payment data generated from the payment action initiation into a macro;
      normalize the payment data generated from the payment action initiation into a payment action data;
      determine a type of payment action based on the payment action data;
      categorize the determined type of payment action;
      populate the determined type of payment action into a leads worksheet;
      populate the determined type of payment action into a sales team worksheet;
      populate the determined type of payment action into a year to date worksheet;
      merge the determined type of payment action on the year to date worksheet, the determined type of payment action onto the sales team worksheet and the determined type of payment action onto the leads worksheet into a master breakdown worksheet to generate a working corpus of data;
      receive a search query from a user display device requesting the determined type of payment action for one or more sales team members or the plurality of real time data for a selected one or more performance metric data for the one or more sales team members;
      select the determined type of payment action for the one or more sales team members from the working corpus of data or the selected plurality of real time data for the selected one or more performance metrics for the one or more sales team members; and
      output the data corresponding to the determined type of payment action for the one or more sales team members from the working corpus such that the data causes the user display device to display the type of the determined type of payment action or the selected plurality of real time data for the selected one or more performance metrics for the one or more sales team members;
      determine when the plurality of real time data within the working corpus of data for the one or more performance metric data meets a predetermined threshold; and
      identify when the plurality of real time data within the working corpus of data for the one or more performance metric data meets the predetermined threshold by distinguishing the plurality of real time data that meets the predetermined threshold when displayed on the user display device,
wherein the determined type of payment action is the plurality of real time data that corresponds to the one or more performance metric data.

2. The system of claim 1, wherein the leads worksheet, the sales team worksheet, and the year to date worksheet are incorporated into a graphical user interface that is displayed on the user display device.

3. The system of claim 2, wherein the one or more performance metric data of the leads worksheet includes a plurality of biographically information on a plurality of leads, a lead status and a closing of deals with respect to the one or more sales team members.

4. The system of claim 3, wherein the one or more performance metric data of the leads worksheet further includes a booking date category, a booking time category, a resolution category, and a pay period category.

5. The system of claim 2, wherein the non-transitory, processor-readable storage medium further comprising one or more programming instructions that, when executed, cause the processing device to:
normalize a plurality of sales data populated onto the sales team worksheet such that the plurality of sales data may be transformed into a formats to visually display the plurality of sales data on the graphical user interface in real time.

6. The system of claim 5, wherein the one or more performance metric data of the sales team worksheet includes a month category, a week category, a pay period category, a date category, a client name category, an amount collected category, a setter/closer category, an e-mail category, a left to pay category and a data string category.

7. The system of claim 3, wherein the one or more performance metric data of the year to date worksheet includes the plurality of leads for each specific team member of the one or more sales team members that have been assigned and are visually displayed for a user to view a year-to-date comparison with other specific team member of the one or more sales team members.

8. The system of claim 2, wherein the non-transitory, processor-readable storage medium further comprising one or more programming instructions that, when executed, cause the processing device to:
gather and populate a plurality of sales data from the sales team worksheet onto a summary worksheet,
gather and populate a plurality of leads data from the leads worksheet onto the summary worksheet, and
gather and populate a plurality of specific data points in real time,
wherein the plurality of specific data points, the plurality of sales data, and the plurality of leads data is the plurality of real time data, and
wherein the summary worksheet is incorporated into the graphical user interface that is displayed on the user display device.

9. The system of claim 8, wherein the plurality of specific data points, the plurality of sales data, and the plurality of leads data is populated into the one or more performance metric data of the summary worksheet as the plurality of real time data.

10. The system of claim 9, wherein the one or more performance metric data of the summary worksheet is broken into a weekly segment that displays the plurality of real time data of the one or more performance metric data of the summary worksheet relating to a display of each specific sales team member of the one or more sales team members for each month of a year.

11. The system of claim 10, wherein the one or more performance metric data of the summary worksheet is broken into a yearly marks segment that displays the plurality of real time data of the one or more performance metric data of the summary worksheet relating to a display of each specific sales team member of the one or more sales team members for the year to date.

12. The system of claim 11, wherein the one or more performance metric data of the summary worksheet is broken into a month marks segment that displays the plurality of real time data of the one or more performance metric data of the summary worksheet relating to a display of every one of the one or more sales team members for each month.

13. The system of claim 12, wherein the one or more performance metric data of the summary worksheet is broken into a monthly marks by advisor that displays the plurality of real time data of the one or more performance metric data of the summary worksheet relating to a display of each specific sales team member of the one or more sales team members for each month of a year.

14. The system of claim 9, wherein the one or more performance metric data of the summary worksheet includes a week category, a sales team member category, a total leads category, an amount collected category, a dollars per lead category, a total contacts lead category, a dollars per lead talked to category, and a resolutions category.

15. The system of claim 14, wherein the dollars per lead category is determined by the following equation:

$$\frac{\text{amount collected}}{\text{total leads}}.$$

16. The system of claim 14, wherein the resolutions category includes a plurality of data relating to dispositions of potential leads for each specific team member of the one or more sales team members to graphically illustrate a customer relationship management with each specific sales team member of the one or more sales team members.

17. The system of claim 1, wherein the type of payment action is a refund or a payment.

18. The system of claim 17, wherein the type of the determined type of payment action that is displayed is a payment amount.

19. The system of claim 18, wherein the type of the determined type of payment action that is displayed is a refund amount.

20. The system of claim 19, wherein the type of the determined type of payment action that is displayed is a refund percentage amount.

21. A method to identify one or more performance metric data and a plurality of real time data thereof, the method comprising:
obtaining, by a processing device, a payment action initiation that is initiated external to the processing device;
adding, by the processing device, a payment data generated from the payment action initiation into a macro;
normalizing, by the processing device, the payment data generated from the payment action initiation into a payment action data;

determining, by the processing device, a type of payment action based on the payment action data;
categorizing, by the processing device, the determined type of payment action;
populating, by the processing device, the determined type of payment action into a leads worksheet;
populating, by the processing device, the determined type of payment action into a sales team worksheet;
populating, by the processing device, the determined type of payment action into a year to date worksheet;
merging, by the processing device, the determined type of payment action in the year to date worksheet, the determined type of payment action into the sales team worksheet and the determined type of payment action into the leads worksheet into a master breakdown worksheet to generate a working corpus of data;
receiving, by the processing device, a search query from a user display device requesting the determined type of payment action for one or more sales team members or the plurality of real time data for a selected one or more performance metric data;
selecting, by the processing device, the determined type of payment action for the one or more sales team members from the working corpus of data or the selected plurality of real time data for the selected one or more performance metrics for the one or more sales team members;
outputting, to the user display device, the data corresponding to the determined type of payment action for the one or more sales team members from the working corpus such that the data causes the user display device to display the type of the determined type of payment action or the selected plurality of real time data for the selected one or more performance metrics for the one or more sales team members and
determining, by the processing device, when the plurality of real time data within the working corpus of data for the one or more performance metric data meets a predetermined threshold;
identifying, by the processing device, when the plurality of real time data within the working corpus of data for the one or more performance metric data meets the predetermined threshold by distinguishing the plurality of real time data that meets the predetermined threshold when displayed on the user display device;
generating, by the processing device, the plurality of real time data relating to a visualization of the selected one or more performance metrics in predetermined categories related to at least one specific sales team member of the one or more sales team members for a specific time period; and
displaying, by the processing device, the plurality of real time data relating to the visualization of the selected one or more performance metrics for the specific time period,
wherein the determined type of payment action is the plurality of real time data that corresponds to the one or more performance metric data.

22. The method of claim 21, wherein the leads worksheet, the sales team worksheet, and the year to date worksheet are incorporated into a graphical user interface that is displayed on the user display device.

23. The method of claim 22, wherein the one or more performance metric data of the leads worksheet includes a plurality of biographically information on a plurality of leads, a lead status and a closing of deals with respect to the one or more sales team members.

24. The method of claim 23, wherein the one or more performance metric data of the leads worksheet further includes a booking date category, a booking time category, a resolution category, and a pay period category.

25. The method of claim 22, further comprising:
Normalizing, by the processing device, a plurality of sales data populated into the sales team worksheet such that the plurality of sales data may be transformed into a format to visually display the plurality of sales data on the graphical user interface in real time.

26. The method of claim 25, wherein the one or more performance metric data of the sales team worksheet includes a month category, a week category, a pay period category, a date category, a client name category, an amount collected category, a setter/closer category, an e-mail category, a left to pay category and a data string category.

27. The method of claim 23, wherein the one or more performance metric data of the year to date worksheet includes the plurality of leads for each specific team member of the one or more sales team members that have been assigned and are visually displayed for a user to view a year-to-date comparison with other specific team member of the one or more sales team members.

28. The method of claim 22, further comprising:
gathering and populating, by the processing device, a plurality of sales data from the sales team worksheet into a summary worksheet,
gathering and populating, by the processing device, a plurality of leads data from the leads worksheet into the summary worksheet, and
gathering and populating, by the processing device, a plurality of specific data points in real time,
wherein the plurality of specific data points, the plurality of sales data, and the plurality of leads data is the plurality of real time data, and
wherein the summary worksheet is incorporated into the graphical user interface that is displayed on the user display device.

29. The method of claim 28, wherein the plurality of specific data points, the plurality of sales data, and the plurality of leads data is populated into the one or more performance metric data of the summary worksheet as the plurality of real time data.

30. The method of claim 29, wherein:
the one or more performance metric data of the summary worksheet is broken into a weekly segment that displays the plurality of real time data of the one or more performance metric data of the summary worksheet relating to a display of each specific sales team member of the one or more sales team members for each month of a year;
the one or more performance metric data of the summary worksheet is broken into a yearly marks segment that displays the plurality of real time data of the one or more performance metric data of the summary worksheet relating to a display of each specific sales team member of the one or more sales team members for the year to date;
the one or more performance metric data of the summary worksheet is broken into a month marks segment that displays the plurality of real time data of the one or more performance metric data of the summary worksheet relating to a display of every one of the one or more sales team members for each month; and
the one or more performance metric data of the summary worksheet is broken into a monthly marks by advisor that displays the plurality of real time data of the one or more performance metric data of the summary worksheet relating to a display of each specific sales team member of the one or more sales team members for each month of a year.

\* \* \* \* \*